(12) United States Patent
Fukuda et al.

(10) Patent No.: US 10,408,984 B2
(45) Date of Patent: Sep. 10, 2019

(54) OPTICAL PHASE DIFFERENCE COMPONENT, COMPOSITE OPTICAL COMPONENT, INCORPORATING OPTICAL PHASE DIFFERENCE COMPONENT, AND METHOD FOR MANUFACTURING OPTICAL PHASE DIFFERENCE COMPONENT

(71) Applicant: JX NIPPON OIL & ENERGY CORPORATION, Tokyo (JP)

(72) Inventors: Maki Fukuda, Yokohama (JP); Hironao Tanaka, Yamato (JP); Suzushi Nishimura, Yokohama (JP)

(73) Assignee: JX NIPPON OIL AND ENERGY CORPORATION, Tokyo (JP)

( * ) Notice: Subject to any disclaimer, the term of this patent is extended or adjusted under 35 U.S.C. 154(b) by 219 days.

(21) Appl. No.: 15/470,489

(22) Filed: Mar. 27, 2017

(65) Prior Publication Data
US 2017/0199313 A1 Jul. 13, 2017

Related U.S. Application Data

(63) Continuation of application No. PCT/JP2015/069083, filed on Jul. 2, 2015.

(30) Foreign Application Priority Data

Oct. 10, 2014 (JP) .................................. 2014-209192

(51) Int. Cl.
*G02B 5/30* (2006.01)
*H01L 51/50* (2006.01)
(Continued)

(52) U.S. Cl.
CPC ............. *G02B 5/3083* (2013.01); *G02B 1/14* (2015.01); *H01L 51/50* (2013.01); *G02F 2001/133631* (2013.01)

(58) Field of Classification Search
CPC ..... G02B 5/3083; G02B 1/14; G02F 1/13363; H01L 51/50
(Continued)

(56) References Cited

U.S. PATENT DOCUMENTS

2005/0045799 A1 3/2005 Deng et al.
2007/0070276 A1 3/2007 Tan et al.
(Continued)

FOREIGN PATENT DOCUMENTS

JP S62-269104 A 11/1987
JP H05-238827 A 9/1993
(Continued)

OTHER PUBLICATIONS

Tadao, "Magneto-optical element and optical device", JP2005-055921A, machine translation. (Year: 2005).*
(Continued)

*Primary Examiner* — Wen Huang
(74) *Attorney, Agent, or Firm* — Oliff PLC

(57) ABSTRACT

An optical phase difference component includes: a transparent base with a concave-convex pattern; gaps defined between convex portions of the concave-convex pattern; and a closing layer provided on the concave-convex pattern to connect the convex portions of the concave-convex pattern and to close the gaps. The phase difference property of the optical phase difference component is not reduced, even when the optical phase difference component is joined to another component with adhesive or when load is applied to the optical phase difference component.

17 Claims, 7 Drawing Sheets

(51) Int. Cl.
  *G02B 1/14* (2015.01)
  *G02F 1/13363* (2006.01)
(58) Field of Classification Search
  USPC .................................................... 359/489.07
  See application file for complete search history.

(56) References Cited

U.S. PATENT DOCUMENTS

| | | | |
|---|---|---|---|
| 2013/0177717 | A1 | 7/2013 | Koike et al. |
| 2014/0016208 | A1 | 1/2014 | Edmonds et al. |
| 2016/0011351 | A1 | 1/2016 | Tomohisa et al. |

FOREIGN PATENT DOCUMENTS

| | | |
|---|---|---|
| JP | H06-122852 A | 5/1994 |
| JP | H06-240208 A | 8/1994 |
| JP | H06-299118 A | 10/1994 |
| JP | H06-306329 A | 11/1994 |
| JP | H07-196986 A | 8/1995 |
| JP | H07-99402 B2 | 10/1995 |
| JP | H08-112879 A | 5/1996 |
| JP | 2004-052028 A | 2/2004 |
| JP | 2004-198902 A | 7/2004 |
| JP | 2005-010377 A | 1/2005 |
| JP | 2005-055921 A | 3/2005 |
| JP | 2006-323059 A | 11/2006 |
| JP | 2010-091644 A | 11/2006 |
| JP | 2007-156441 A | 6/2007 |
| JP | 2008-185602 A | 8/2008 |
| JP | 2011-039351 A | 2/2011 |
| JP | 2011-113631 A | 6/2011 |
| JP | 2012-008363 A | 1/2012 |
| JP | 2014-522501 A | 9/2014 |
| WO | 2014/136820 A1 | 9/2014 |

OTHER PUBLICATIONS

Aug. 25, 2015 Written Opinion issued in International Patent Application No. PCT/JP2015/069083.
Aug. 25, 2015 Search Report issued in International Patent Application No. PCT/JP2015/069083.
Jun. 19, 2018 Office Action issued in Japanese Patent Application No. 2016-552846.
Apr. 26, 2019 Office Action issued in Taiwanese Patent Application No. 104123215.

* cited by examiner

Fig. 5

| | MATERIAL OF CONCAVE-CONVEX PATTERN | TiO₂ FILM THICKNESS [nm] | ITO FILM THICKNESS [nm] | EVALUATION FOR LOAD-BEARING PROPERTY | PHASE DIFFERENCE BEFORE ADHESION [nm] | PHASE DIFFERENCE AFTER ADHESION [nm] | RATIO OF PHASE DIFFERENCE CHANGE [%] |
|---|---|---|---|---|---|---|---|
| EXAMPLE 1 | UV curable resin | 450 | - | ○ | 154 | 153 | 1 |
| EXAMPLE 2 | UV curable resin | 200 | 250 | ○ | 135 | 135 | 0 |
| EXAMPLE 3 | sol-gel material | 450 | - | ○ | 140 | 138 | 1 |
| COMPARATIVE EXAMPLE 1 | UV curable resin | 120 | - | × | 143 | 104 | 27 |
| COMPARATIVE EXAMPLE 2 | UV curable resin | 50 | - | × | 107 | 48 | 55 |

OPTICAL PHASE DIFFERENCE COMPONENT, COMPOSITE OPTICAL COMPONENT, INCORPORATING OPTICAL PHASE DIFFERENCE COMPONENT, AND METHOD FOR MANUFACTURING OPTICAL PHASE DIFFERENCE COMPONENT

CROSS REFERENCE TO RELATED APPLICATION

This application is a continuation application of International Patent Application No. PCT/JP2015/069083 filed on Jul. 2, 2015 claiming the benefit of priority of Japanese Patent Application No. 2014-209192 filed on Oct. 10, 2014. The contents of International Patent Application No. PCT/JP2015/069083 and Japanese Patent Application No. 2014-209192 are incorporated herein by reference in their entities.

BACKGROUND OF THE INVENTION

Field of the Invention

The present invention relates to an optical phase difference component (wave plate or retardation plate), a composite optical component (composite optical member) incorporating the optical phase difference component, and a method for manufacturing the optical phase difference component.

Description of the Related Art

Optical phase difference plates have so many uses, and are used for various uses such as reflective liquid crystal display devices, semi-transmissive liquid crystal display devices, pickups for optical disks, and PS conversion elements.

Examples of the optical phase difference plates include those formed by doubly refracting crystal or birefringent crystal that originally exists in the nature, such as calcite, mica, and crystal, those formed by a birefringent polymer, and those formed by artificially providing a periodic structure shorter than a wavelength to be used.

The optical phase difference plate formed by artificially providing the periodic structure is exemplified by an optical phase difference plate provided with a concave-convex structure (concave and convex structure) on a transparent substrate. The concave-convex structure used for the optical phase difference plate has a period (pitch) shorter than a wavelength to be used, and has a pattern such as a stripe pattern as depicted in FIG. 6. Such a concave-convex structure has refractive index anisotropy. When light enters an optical phase difference plate 400 depicted in FIG. 6 vertically to a substrate 420 of the optical phase difference plate 400, a polarization light component parallel to a periodic direction of the concave-convex structure and a polarization light component vertical to the periodic direction of the concave-convex structure travel in the concave-convex structure at different speeds. This generates a phase difference (retardation) between the two polarization light components. Such a phase difference may be controlled, for example, by a height (depth) of the concave-convex structure and the difference in refractive index between a material of convex portions and a material (air) of gaps between convex portions. The optical phase difference plate to be used in the above-listed devices such as the display devices is required to generate a phase difference of λ/4 or λ/2 (λ represents a wavelength to be used) to a wavelength to be used λ. In order to form the optical phase difference plate that can generate such a sufficient phase difference, there is a need to considerably increase the height (depth) of the concave-convex structure and the difference in refractive index between the material of convex portions and the material (air) of gaps between convex portions. Japanese Examined Patent Publication No. H07-99402 and Japanese Patent Application Laid-open No. 2005-10377 each disclose an optical phase difference plate in which a surface of a concave-convex structure is coated with a high refractive index material.

SUMMARY OF THE INVENTION

The inventors of the present invention revealed, through the diligent studies and investigations, that the above optical phase difference plate has the following problems. When used for devices, such as the above-listed display devices, the optical phase difference plate is used in a state of being adhered to another component. For example, when the optical phase difference plate is used in an organic EL display device (organic Electro-Luminescence display device or organic light emitting diode display device), a surface of the optical phase difference plate is required to adhere (be joined) to a polarization plate, and the other surface is required to adhere to an organic EL panel. Adhesive is typically used to cause the optical phase difference plate to adhere to another component. However, as depicted in FIG. 7A, when an optical phase difference plate 400 is caused to adhere to another component 320 by use of adhesive, an adhesive 340 enters between convex portions of the concave-convex structure of the optical phase difference plate 400. The refractive index of the adhesive is greater than that of air, and thus the difference in refractive index between the material of convex portions and the adhesive entering between convex portions is smaller than the difference in refractive index between the material of convex portions and air. Thus, regarding the optical phase difference plate 400 having the adhesive entering between convex portions, the difference in refractive index between the material of convex portions and the material of gaps between convex portions is small, which results in small refractive index anisotropy. This makes it impossible for the optical phase difference plate 400 to generate a sufficient phase difference.

Further, in order that the optical phase difference plate generates a desired phase difference, the concave-convex structure of the optical phase difference plate is required to have both a periodic structure of which period (pitch) is shorter than a wavelength to be used and enough height (depth) of concavities and convexities. Namely, the concave-convex structure is required to have high aspect ratio. When a load is applied on such an optical phase difference plate, however, the concave-convex structure of the optical phase difference plate 400 could be deformed (fall down), making it impossible to generate a desired phase difference, as depicted in FIG. 7B.

An object of the present invention is to solve the conventional technology problems and to provide an optical phase difference component that can generate a desired phase difference even when the component is joined to another component and/or when a load is applied to the component, and a method for manufacturing the optical phase difference component.

According to a first aspect of the present invention, there is provided an optical phase difference component, including:

a transparent base with a concave-convex pattern having concave portions and convex portions;

a gap defined between the convex portions of the concave-convex pattern; and a closing layer provided on the concave-convex pattern to connect the convex portions of the concave-convex pattern and to close the gap.

In the optical phase difference component, each of the convex portions of the concave-convex pattern may have a trapezoidal cross-sectional shape.

In the optical phase difference component, the gap may have a height equal to or higher than that of each of the convex portions of the concave-convex pattern.

The optical phase difference component may further include a coating layer coating surfaces of the concave portions and the convex portions of the concave-convex pattern.

In the optical phase difference component, the coating layer may have a refractive index which is greater than that of the convex portions of the concave-convex pattern.

In the optical phase difference component, the coating layer and the closing layer may be made from the same material. Or, the coating layer and the closing layer may be made from mutually different materials.

In the optical phase difference component, the coating layer may be made from metal, metal oxide, metal nitride, metal sulfide, metal oxynitride, or metal halide.

In the optical phase difference component, the closing layer may be made from metal, metal oxide, metal nitride, metal sulfide, metal oxynitride, or metal halide.

In the optical phase difference component, the concave-convex pattern may be made from a photo-curable resin or a thermo-setting resin. Or, the concave-convex pattern may be made from a sol-gel material.

In the optical phase difference component, the gap may contain air.

The optical phase difference component may further include a protective component which adheres to the closing layer and/or a surface, of the transparent base, opposite to a surface with the concave-convex pattern.

According to a second aspect of the present invention, there is provided a composite optical component, including:
the optical phase difference component as defined in the first aspect; and
an optical component adhering to the closing layer or a surface, of the transparent base, opposite to a surface with the concave-convex pattern.

The optical component may be a polarization plate.

According to a third aspect of the present invention, there is provided a display device, including:
the composite optical component as defined in the second aspect; and
a display element adhering to the closing layer or a surface, of the transparent base, opposite to a surface with the concave-convex pattern.

According to a fourth aspect of the present invention, there is provided a method for manufacturing an optical phase difference component, including:
preparing a transparent base with a concave-convex pattern having concave portions and convex portions; and
forming a closing layer on the concave-convex pattern of the transparent base to connect adjacent convex portions included in the convex portions and to close a gap defined between the adjacent convex portions.

In the method for manufacturing the optical phase difference component, the closing layer may be formed by sputtering, CVD, or evaporation deposition in the forming of the closing layer.

The method for manufacturing the optical phase difference component may further include forming a coating layer coating surfaces of the concave portions and the convex portions of the concave-convex pattern.

In the optical phase difference component of the present invention, the gap between adjacent convex portions of the concave-convex pattern (concave-convex structure) of the base is closed with the closing layer and the concave-convex pattern. This eliminates a situation in which adhesive enters the gap between the convex portions of the concave-convex pattern when the optical phase difference component is incorporated into a device. Thus, refractive index anisotropy of the optical phase difference component is prevented from decreasing which would be otherwise caused by the decrease in difference in refractive index between a material of convex portions and a material of the gap between convex portions. Accordingly, the optical phase difference component of the present invention can have a good phase difference property even after being incorporated into a device. Further, since the closing layer is formed on the convex portions of the concave-convex pattern and above the gap so as to connect or bridge adjacent convex portions, the convex portions of the concave-convex pattern are not likely to be deformed when a load is applied thereto. This prevents a situation in which the optical phase difference component can not generate a desired phase difference. Therefore, the optical phase difference component of the present invention is suitably used for various uses, such as display devices.

BRIEF DESCRIPTION OF THE DRAWINGS

FIG. 5 is a table indicating evaluation results of a phase difference property and a load-bearing property of optical phase difference components manufactured in examples and comparative examples.

DESCRIPTION OF THE PREFERRED EMBODIMENTS

In the following, embodiments of an optical phase difference component, a method for manufacturing the optical phase difference component, and a composite optical component including the optical phase difference component according to the present invention will be explained with reference to the drawings.

[Optical Phase Difference Component]

Figure 1A:
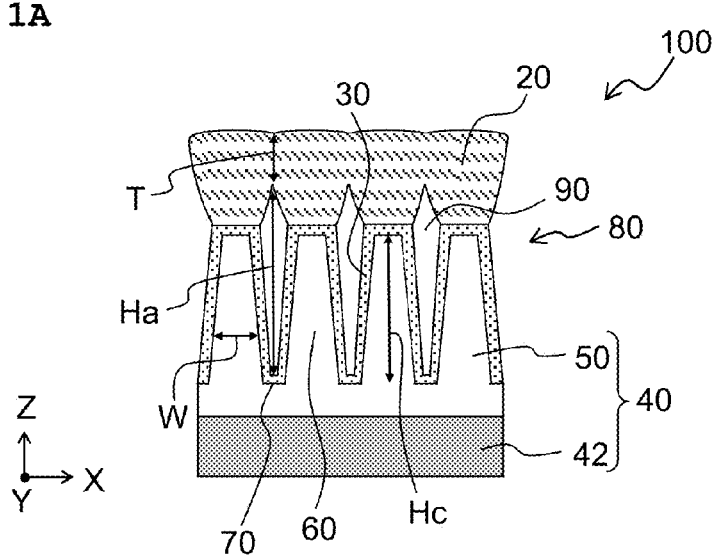
FIGS. 1A to 1C each schematically depict an exemplary cross-sectional structure of an optical phase difference component of an embodiment.

As depicted in FIG. 1A, an optical phase difference component 100 of the embodiment includes a transparent base 40 with a concave-convex pattern 80, gaps 90 defined between adjacent convex portions 60 of the concave-convex pattern 80, and a closing layer (covering layer or sealing layer) 20 that is disposed on the convex portions 60 of the concave-convex pattern 80 and above gaps 90 (on the concave-convex pattern) to connect adjacent convex portions 60 and to cover the convex portions 60 and gaps 90. The gaps 90 are surrounded and closed by the concave-convex pattern 80 and the closing layer 20. A coating layer 30 coats the surfaces of the concave and convex portions of the concave-convex pattern 80 of the transparent base 40.

<Transparent Base>

In the optical phase difference component 100 of the embodiment depicted in FIG. 1A, the transparent base 40 is formed by a plate-shaped substrate 42 and a concave-convex structure layer 50. The substrate 42 is not particularly limited, and publicly known substrates transmitting visible light may be used as the substrate 42 as appropriate. Examples of those usable as the substrate 42 include substrates made from transparent inorganic materials such as glass; and substrates made from resins such as polyester (polyethylene terephthalate, polybutylene terephthalate, polyethylene naphthalate, polyarylate, and the like), an acrylic-based resin (polymethyl methacrylate and the like), polycarbonate, polyvinyl chloride, a styrene-based resin (ABS resin and the like), a cellulose-based resin (triacetyl cellulose and the like), a polyimide-based resin (polyimide resin, polyimideamide resin, and the like) and cycloolefin polymer. When the optical phase difference component 100 is used for an antireflection film of an organic EL display, the substrate 42 is preferably a flexible substrate. In this respect, substrates made from resins are preferably used. It is allowable to perform a surface treatment for the substrate 42 or to provide an easy-adhesion layer on the substrate 42 so as to improve the adhesion property of the substrate 42 and/or it is allowable to provide a smoothing layer to cover any protrusion on a surface of the substrate 42. The thickness of the substrate 42 is preferably in a range of 1 µm to 20 mm.

In the transparent base 40, the concave-convex structure layer 50 configuring convex portions 60 and concave portions 70 is formed on the substrate 42, which allows the transparent base 40 to include the concave-convex pattern 80. The concave-convex structure layer 50 is preferably made from a material of which refraction index is in a range of 1.1 to 1.6. As materials configuring the concave-convex structure 50, it is allowable to use inorganic materials exemplified, for example, by silicon (Si)-based materials such as silica, SiN, and SiON; titanium (Ti)-based materials such as $TiO_2$; materials based on indium-tin oxide (ITO); and ZnO, ZnS, $ZrO_2$, $Al_2O_3$, $BaTiO_3$, $Cu_2O$, MgS, AgBr, CuBr, BaO, $Nb_2O_5$, and $SrTiO_2$. The above-listed inorganic materials may be materials (sol-gel materials) formed by a sol-gel method or the like. In addition to the above inorganic materials, it is possible to use resin materials exemplified, for example, by thermoplastic resins such as polyethylene, polypropylene, polyvinyl alcohol, polyvinylidene chloride, polyethylene terephthalate, polyvinyl chloride, polystyrene, an AS resin, an acrylic resin, polyamide, polyacetal, polybutylene terephthalate, glass reinforced polyethylene terephthalate, polycarbonate, modified polyphenylene ether, polyphenylene sulfide, polyether ether ketone, a fluorine resin, polyarylate, polysulfone, polyether sulfone, polyamideimide, polyetherimide, and thermoplastic polyimide; thermosetting resins such as a phenolic resin, melamine resin, urea resin, epoxy resin, unsaturated polyester resin, alkyd resin, silicone resin, and diallyl phthalate resin; ultraviolet curable resins such as ultraviolet-curing (meth)acrylate based resin, ultraviolet-curing acrylic urethane-based resin, ultraviolet-curing polyester acrylate-based resin, ultraviolet-curing epoxy acrylate resin, ultraviolet-curing polyol acrylate resin, and ultraviolet-curing epoxy resin; and resin materials obtained by blending more than two kinds of the above materials. Further, a composite material of the resin material(s) and the inorganic material(s) may be used. In order to obtain a hard coating property and the like, examples of materials of the concave-convex structure 50 may include publicly known fine particles and/or filler, in addition to the inorganic materials and/or the resin materials. Further, a material obtained by allowing the above material(s) to contain an ultraviolet absorbent material may be used. The ultraviolet absorbent material has the function or effect to prevent deterioration of the concave-convex structure layer 50 by absorbing ultraviolet rays and converting the light energy into something harmless such as heat. Any publicly known agent may be used as the ultraviolet absorbent material. Those usable as the ultraviolet absorbent material include, for example, benzotriazole-based absorbents, triazine-based absorbents, salicylic acid derivative-based absorbents, and benzophenone-based absorbents.

The convex portions 60 of the concave-convex pattern 80 are arranged at a pitch shorter than a design wavelength. Each convex portion 60 extends in a Y direction (direction perpendicular to the paper surface in the drawing sheet) in FIG. 1A. The cross-sectional shape of each convex portion 60 in a ZX plane orthogonal to the extending direction of each convex portion 60 is preferably a trapezoid. The cross-sectional shape of the convex portion 60 is not limited to the trapezoidal shape, and may be various shapes such as a rectangular shape and multangular shape. As described later, for forming the closing layer 20 easily, the tops of the convex portions 60 are preferably flat, that is, they preferably have a planer shape parallel to the surface of the substrate 42. The concave portions 70, which are defined by the convex portions 60, extend in the Y direction (direction perpendicular to the paper surface in the drawing sheet) along the convex portions 60.

Each of the convex portions 60 preferably has a height Hc in a range of 100 to 2000 nm (the height of concavities and convexities is preferably in a range of 100 to 2000 nm). If the height Hc of the convex portion 60 is less than 100 nm, it is difficult to generate a desired phase difference when visible light enters the optical phase difference component 100. If the height Hc of the convex portion 60 exceeds 2000 nm, the aspect ratio of the convex portion 60 (ratio between height and width of the convex portion) is high, thus making it difficult to form the concave-convex pattern. Each of the convex portions 60 preferably has a width W in a range of 10 to 500 nm. If the width W of the convex portion 60 is less than 10 nm, the aspect ratio of the convex portion 60 (ratio between height and width of the convex portion) is high, thus making it difficult to form the concave-convex pattern. If the width W of the convex portion 60 exceeds 500 nm, coloring of transmitted light occurs, which makes it difficult for the optical phase difference component to have sufficient colorless and transparent properties. Further, the width W of the convex portion 60 exceeding 500 nm makes it difficult for the optical phase difference component to generate a desired phase difference. Furthermore, the width W of the convex portion 60 exceeding 500 nm leads to large intervals between upper parts of adjacent convex portions 60, which makes it difficult to form the closing layer 20 with high strength. Here, the width W of the convex portion 60 means an average value of widths of the convex portions 60 at positions in a Z direction (positions in a height direction).

The concave-convex pitch of the concave-convex pattern 80 is preferably in a range of 100 to 1000 nm. If the pitch is less than 100 nm, it is difficult to generate a desired phase difference when visible light enters the optical phase difference component 100. If the pitch exceeds 1000 nm, it is difficult for the optical phase difference component to have sufficient colorless and transparent properties. Further, the pitch exceeding 1000 nm leads to large intervals between upper parts of adjacent convex portions 60, which makes it difficult to form the closing layer 20 with high strength.

<Coating Layer>

The coating layer 30 coats the transparent base 40 along the concave-convex pattern 80. Namely, the coating layer 30 coats surfaces of the convex portions 60 and the concave portions 70 of the concave-convex pattern 80. The thickness of the coating layer 30 is preferably not less than 10 nm. The thickness of the coating layer 30 is determined so that the phase difference to be generated by the optical phase difference component 100 may have a desired value. In that case, the coating layer 30 preferably has a thickness by which the gaps 90 are formed between adjacent convex portions 60. If the coating layer is too thick, the gaps 90 can not be formed between the coating layer 30 and the closing layer 20. This makes it impossible to utilize the difference in refractive index between the coating layer 30 and air and the like existing in the gaps 90, thus making it difficult to obtain a desired phase difference. The coating layer 30 is preferably made from a material of which refractive index is in a range of 1.8 to 2.6. Coating the concave-convex pattern 80 with the coating layer 30 of which refractive index is not less than 1.8 increases a phase difference generated by the periodical arrangement of the convex portions 60 and the gaps 90. With this, it is possible to reduce the height of the convex portions 60, that is, it is possible to reduce the aspect ratio of the convex portions 60, which makes it easy to form the concave-convex pattern 80. A substance of which refractive index exceeds 2.6 is difficult to obtain, or has difficulty in forming a film at temperatures not causing deformation of the substrate 42. Examples of materials configuring the conveying layer 30 include metals such as Ti, In, Zr, Ta, Nb, and Zn, and inorganic materials such as oxide, nitride, sulfide, oxynitride, and halide of the above metals. The coating layer 30 may be a component containing the above materials. There is no need that the optical phase difference component according to the present invention include the coating layer 30. Namely, the coating layer 30 is not indispensable to the optical phase difference component according to the present invention.

<Gaps>

The gaps 90 are defined between adjacent convex portions 60. The gaps 90 are surrounded and closed by the convex portions 60, concave portions 70, and closing layer 20. Namely, the gaps 90 are closed by or sealed with the concave-convex pattern 80 and the closing layer 20. The gaps 90 may be filled with air, inert gas such as $N_2$, Ar, and He, other low refractive index mediums, or the like. The gaps 90 may be filled with no medium, namely, the gaps 90 may be a vacuum. Each of the gaps 90 preferably has a height Ha equal to or higher than the height Hc of each of the convex portions 60. The optical phase difference component 100 generates a phase difference by the periodical arrangement of the gaps 90 and the convex portions 60. When the height Ha of the gaps 90 is smaller than the height Hc of the convex portions 60, the height of the periodic arrangement structure of the gaps 90 and convex portions 60 is small. This reduces the phase difference generated by the optical phase difference component 100.

<Closing Layer>

The closing layer 20 is formed on the convex portions 60 and above the gaps 90 to cover the convex portions 60 and the gaps 90. The closing layer 20, together with the convex portions 60 and the concave portions 70, surrounds and closes (seals) the gaps 90. In that configuration, when the optical phase difference component 100 of the present embodiment is joined to another component by adhesive so as to incorporate the optical phase difference component 100 in a device, the adhesive does not enter the gaps 90 between adjacent convex portions 60. This prevents the phase difference generated by the optical phase difference component 100 from decreasing which would be otherwise caused by the entering of adhesive in the gaps between adjacent convex portions. Thus, even when the optical phase difference component 100 of the embodiment is used in a state of being joined to another component, the optical phase difference component 100 can generate a desired phase difference.

The closing layer 20 is formed to connect or bridge adjacent convex portions 60, specifically, tops of the convex portions 60. Thus, when load is applied from above the optical phase difference component 100 (from a closing layer 20 side), each convex portion 60 is supported by adjacent convex portions via the closing layer 20. Connecting the convex portions via the closing layer 20 disperses the applied force, thus reducing the load applied to each convex portion. Thus, even when load is applied to the optical phase difference component 100 of the embodiment, the convex portions 60 of the concave-convex pattern 80 are not likely to be deformed. This prevents a situation in which the optical phase difference component 100 can not generate a desired phase difference due to load application.

Examples of materials of the closing layer 20 may include metals such as Ti, In, Zr, Ta, Nb, and Zn, inorganic materials such as oxide, nitride, sulfide, oxynitride, and halide of the above metals, and components containing them. When the closing layer 20 is formed by sputtering, a target of which deposition rate is fast is preferably used as the raw material of the closing layer 20. The closing layer 20 may be formed by the same material as that of the coating layer 30 or a material different from that of the coating layer 30. The closing layer 20 preferably has a light transmission property. For example, the closing layer 20 preferably has a transmittance of not less than 90% at a wavelength of 550 nm. The refractive index of the closing layer 20 is preferably in a range of 1.4 to 2.6. The closing layer 20 preferably has a thickness T in a range of 10 to 1000 nm. In this context, the thickness T of the closing layer 20 means a distance from an upper end of each gap 90 to a surface of the closing layer 20 (see FIG. 1A). When another component is joined to the closing layer 20 side of the optical phase difference component 100, another component is joined to the closing layer 20 via adhesive. Namely, the closing layer 20 is different from the adhesive used for joining the optical phase difference component 100 and another component.

Figure 1B:
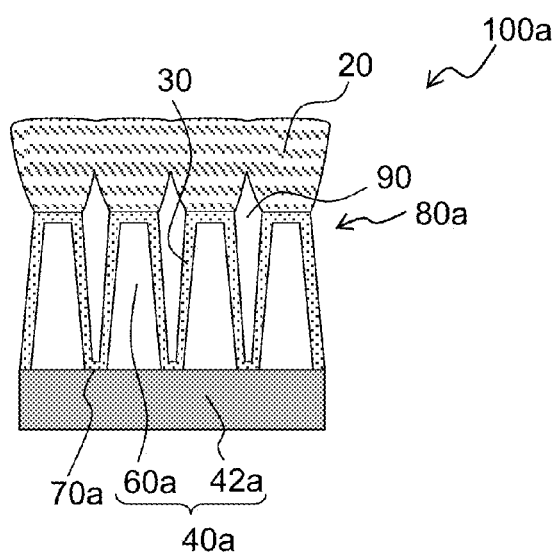

In place of the transparent base 40 in which the concave-convex structure layer 50 is formed on the substrate 42, a transparent base 40a, in which structures forming convex portions 60a are formed on the substrate 42a, may be used, as in an optical phase difference component 100a depicted in FIG. 1B. In the transparent base 40a, concave portions 70a (areas where a surface of the substrate 42a is exposed) are defined between convex portions 60a to form a concave-convex pattern 80a configured by the convex portions 60a and concave portions 70a. A substrate similar to the substrate 42 of the optical phase difference component 100 depicted in FIG. 1A may be used as a substrate 42a. Examples of materials of the convex portions 60a may be the same as those of the concave-convex structure layer 50 of the optical phase difference component 100 depicted in FIG. 1A.

Figure 1C:
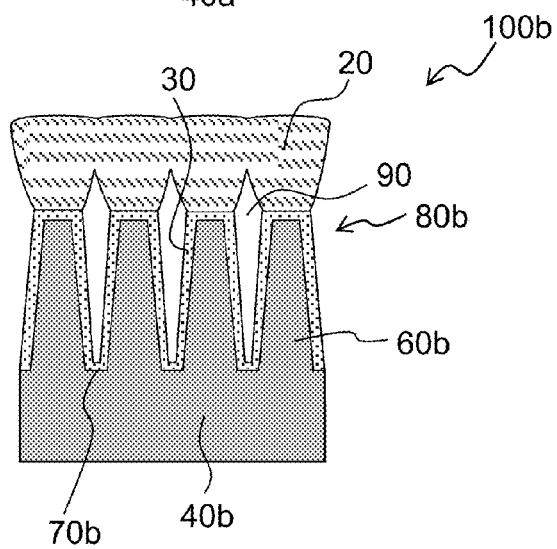

Further, as in an optical phase difference component 100b depicted in FIG. 1C, a transparent base 40b may be configured by a substrate of which surface forms a concave-convex pattern 80b including convex portions 60b and concave portions 70b. In that case, the transparent base 40b may be formed to include the concave-convex pattern 80b as depicted in FIG. 1C.

In each of the optical phase difference components 100, 100a, and 100b, a protective component, such as a protective sheet, may adhere to the closing layer and/or the surface, of the transparent base 40, 40a, or 40b, opposite to the surface with the concave-convex pattern 80, 80a, or 80b. This prevents each of the optical phase difference components 100, 100a, and 100b from being damaged or scarred which would be otherwise caused when each of the optical phase difference components 100, 100a, and 100b is transported, conveyed, or the like.

[Manufacturing Apparatus of Optical Phase Difference Component]

Figure 3:
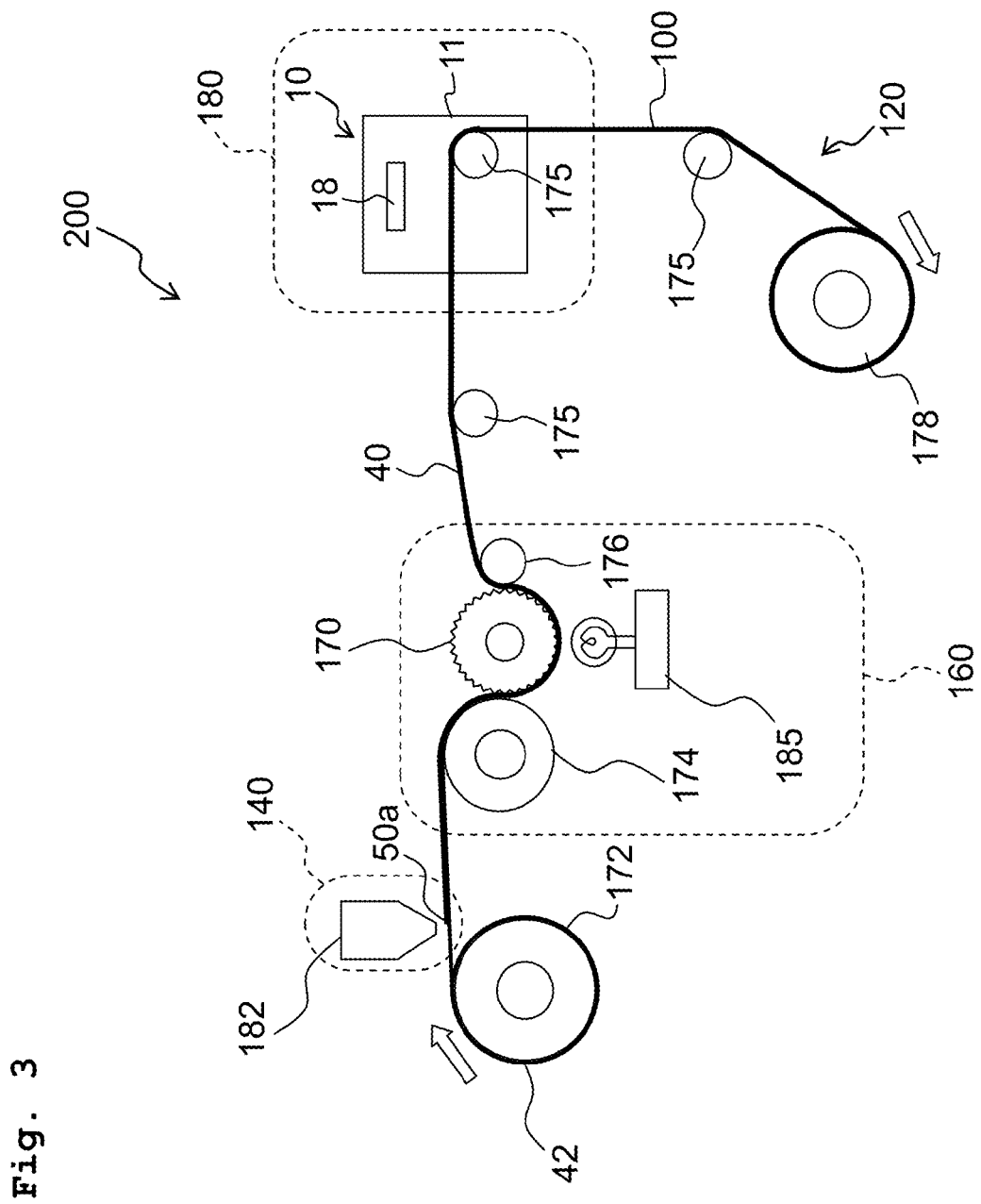
FIG. 3 schematically depicts a manufacturing apparatus used for the method for manufacturing the optical phase difference component of the embodiment.

FIG. 3 depicts a roll process apparatus 200 as an exemplary apparatus for manufacturing the optical phase difference component. The following describes a configuration of the roll process apparatus 200.

The roll process apparatus 200 mainly includes a transport system 120 transporting the film-shaped substrate 42, a coating unit 140 coating the substrate 42 being transported with a UV curable resin, a transfer unit 160 transferring a concave-convex pattern to the UV curable resin, and a film formation unit (deposition unit) 180 forming the coating layer and the closing layer on the concave-convex pattern.

The transport system 120 includes a feeding roll 172 that feeds the film-shaped substrate 42, a nip roll 174 and a peeling roll (releasing roll) 176 that are respectively arranged upstream and downstream of a transfer roll 170 provided in the transfer unit 160 and urge the substrate 42 toward the transfer roll 170, and a winding roll 178 that winds or rolls up the obtained optical phase difference component 100 thereon. The transport system 120 includes guide rolls 175 transporting the substrate 42 to the respective components or parts described above. The coating unit 140 includes a die coater 182 that coats the substrate 42 with a UV curable resin 50a. The transfer unit 160 is disposed downstream of the coating unit 140 in a substrate transporting direction. The transfer unit 160 includes the transfer roll 170 including a concave-convex pattern that will be described later and a radiation light source 185 disposed to face the transfer roll 170 with the substrate 42 intervening therebetween. The film formation unit 180 includes a film formation device (deposition system), such as a sputtering device 10. The sputtering device 10 includes a vacuum chamber 11. Although the vacuum chamber 11 typically has a rectangular parallelepiped shape or cylindrical shape, the vacuum chamber 11 may be any shape provided that the inside of the vacuum chamber 11 is kept in a decompressed state. In the vacuum chamber 11, a sputtering target 18 is disposed to face a surface, of the transparent base 40 being transported, formed with the concave-convex pattern. When the coating layer and closing layer that are made from the inorganic material(s) such as metal, metal oxide, metal nitride, metal sulfide, metal oxynitride, and metal halide, are formed on the concave-convex pattern, the sputtering target 18 made from the inorganic material(s) such as metal, metal oxide, metal nitride, metal sulfide, metal oxynitride, and metal halide may be used.

The transfer roll 170 is a mold in a roll-shape (column shape, cylindrical shape) having an outer circumference surface with the concave-convex pattern. The transfer roll 170 may be manufactured as follows. At first, a master block is manufactured by forming a concave-convex pattern on a substrate, such as silicon, metal, quarts, or resin, by a microfabrication or fine-processing method, such as a photolithography method, cutting (cutting and processing) or machining method, electron-beam direct imaging method, particle beam processing method, or scanning probe processing method. The master block includes a concave-convex pattern formed by convex portions and concave portions extending linearly in an uniform direction.

After forming the master block, a mold to which the concave-convex pattern of the master block is transferred can be formed by an electroforming method or the like, as follows. At first, a seed layer functioning as an electroconductive layer for an electroforming process can be formed on the master block, which has the concave-convex pattern thereon, by means of non-electrolytic plating, sputtering, vapor deposition, or the like. The thickness of the seed layer is preferably not less than 10 nm to uniformize a current density during the subsequent electroforming process, and thereby making the thickness of a metal layer accumulated by the subsequent electroforming process be uniform. Examples of materials of the seed layer include nickel, copper, gold, silver, platinum, titanium, cobalt, tin, zinc, chrome, gold-cobalt alloy, gold-nickel alloy, boron-nickel alloy, solder, copper-nickel-chromium alloy, tin-nickel alloy, nickel-palladium alloy, nickel-cobalt-phosphorus alloy, and alloy thereof. Subsequently, a metal layer is accumulated on the seed layer by the electroforming (electroplating). The entire thickness of the metal layer including the thickness of the seed layer can be, for example, in a range of 10 to 30,000 μm. As the material of the metal layer accumulated by the electroforming, it is possible to use any of the metal species as described above which can be used as the seed layer. Considering ease of the subsequent processes for forming the mold, such as pressing with respect to the resin layer, releasing (peeling-off), and cleaning (washing), the formed metal layer desirably has appropriate hardness and thickness.

The metal layer including the seed layer obtained as described above is released (peeled off) from the master block having the concave-convex structure to obtain a metal substrate. As a releasing method, the metal substrate may be released physically or the materials configuring the concave-convex pattern of the master block may be dissolved to be removed by using an organic solvent dissolving them, acid, alkali, or the like. When the metal substrate is peeled off from the master block, a remaining material component on the metal substrate can be removed by cleaning. As the cleaning method, it is possible to use wet cleaning using a surfactant etc., or dry cleaning using ultraviolet rays and/or plasma. Alternatively, for example, it is allowable to use adhesive or a bonding agent such that the remaining material component is caused to attach or adhere to the adhesive or the bonding agent then is removed. The metal substrate (metal mold) which can be obtained as described above and to which the pattern has been transferred from the master block may be used as the mold for concave-convex pattern transfer of the present embodiment.

Further, a flexible mold, such as a film-shaped mold, can be produced by using the obtained metal substrate and by transferring the concave-convex structure (pattern) of the obtained metal substrate to a film-shaped supporting substrate. For example, after the supporting substrate is coated with a curable resin to form a resin layer, the resin layer is cured while the concave-convex structure of the metal substrate is being pressed against the resin layer. The supporting substrate is exemplified, for example, by base members made from inorganic materials such as glass, quartz (quartz glass), and silicon; base members made from organic materials such as silicone resin, polyethylene terephthalate (PET), polyethylene naphthalate (PEN), polycarbonate (PC), cycloolefin polymer (COP), polymethyl methacrylate (PMMA), polystyrene (PS), polyimide (PI), and polyarylate; and metallic materials such as nickel, copper, and aluminum. The thickness of the supporting substrate may be in a range of 1 to 500 μm.

The curable resin can be exemplified by various resins including, for example, monomers, oligomers, and polymers of those based on epoxy, acryl, methacryl, vinyl ether, oxetane, urethane, melamine, urea, polyester, polyolefin, phenol, cross-linking type liquid crystal, fluorine, silicone, and polyamide. The thickness of the curable resin is preferably in a range of 0.5 to 500 μm. When the thickness is less than the lower limit, heights of the concavities and convexities formed on the surface of the cured resin layer are likely to be insufficient. On the other hand, when the thickness exceeds the upper limit, the influence of volume change of the resin upon curing is likely to be so large that there is such a possibility that formation of the shape of the concavities and convexities might be unsatisfactory.

As a method for coating the supporting substrate with the curable resin, it is possible to adopt, for example, various coating methods such as the spin coating method, spray coating method, dip coating method, dropping method, gravure printing method, screen printing method, relief printing method, die coating method, curtain coating method, ink-jet method, and sputtering method. Further, although the condition for curing the curable resin varies depending on the kind of the resin to be used, the curing temperature is preferably for example in a range of the room temperature to 250° C., and the curing time is preferably in a range of 0.5 minute to 24 hours. Alternatively, a method may be employed in which the curable resin is cured by being irradiated with an energy ray such as ultraviolet light or electron beam. In such a case, the amount of the irradiation is preferably in a range of 20 mJ/cm$^2$ to 10 J/cm$^2$.

Subsequently, the metal substrate is detached from the curable resin layer after curing. The method for detaching the metal substrate is not limited to a mechanical releasing (exfoliating or peeling off) method, and a publicly known method can be adopted. Accordingly, a film-shaped resin mold, which can be obtained in such a manner and which has the cured resin layer having the concavities and convexities and formed on the supporting substrate, may be used as the mold for concave-convex pattern transfer of the present embodiment.

Further, it is possible to coat the concave-convex structure (pattern) of the metal substrate obtained in the above-described manner with a rubber-based resin material, to cure the coated resin material, and to release the cured resin material from the metal substrate, so as to manufacture a rubber mold having the concave-convex pattern of the metal substrate transferred thereto. The obtained rubber mold may be used as the mold for concave-convex pattern transfer of the present embodiment. Those usable as the rubber-based resin material include natural rubber and synthetic rubber. Silicone rubber or a mixture or copolymer of silicone rubber and another material is particularly preferably used as the rubber-based resin material. The usable silicone rubber is exemplified, for example, by polyorganosiloxane, cross-linking type polyorganosiloxane, a polyorganosiloxane/polycarbonate copolymer, a polyorganosiloxane/polyphenylene copolymer, a polyorganosiloxane/polystyrene copolymer, polytrimethyl-silylpropyne, and poly-4-methyl pentene. The silicone rubber is more inexpensive than other resin materials; has superior heat resistance, high heat conductivity, and elasticity; and the silicone rubber is not likely to be deformed under a high temperature condition. Thus, the silicone rubber is suitable for the transfer process for concave-convex pattern under the high temperature condition. Further, since the silicone rubber-based material has high permeability of gas and water vapor, a solvent and water vapor of a material to be subjected to transfer can go through or permeate the silicone rubber material easily. Therefore, the silicone rubber-based material is suitable for such a case of using the rubber mold for the purpose of transferring the concave-convex pattern to a film of a resin material or a solution of a precursor of an inorganic material as described later. Further, the surface free energy of rubber-based material is preferably not more than 25 mN/m. With this, it is possible to obtain a superior mold-releasing property during the transfer of the concave-convex pattern of the rubber mold to the coating film on the base member, thereby making it possible to prevent any transfer failure. The rubber mold may have, for example, a length in a range of 50 to 1000 mm, a width in a range of 50 to 3000 mm, and a thickness in a range of 1 to 50 mm. Further, a mold-release treatment may be performed on the surface of the concave-convex pattern of the rubber mold as needed.

The transfer roll 170 can be obtained by winding the metal mold, film-shaped mold, or rubber mold obtained as described above around an outer circumference surface of a cylindrical base roll and then fixing the mold to the outer circumference surface of the roll. In addition to the above method, the transfer roll 170 can be formed, for example, by forming the concave-convex pattern on a roll surface of a metal roll or the like through the electron-beam direct imaging method, cutting (cutting and processing) or machining method, or the like; or by manufacturing a cylindrical substrate with the concave-convex pattern, fitting and fixing the substrate into a roll.

[Method for Manufacturing Optical Phase Difference Component]

Figure 2:
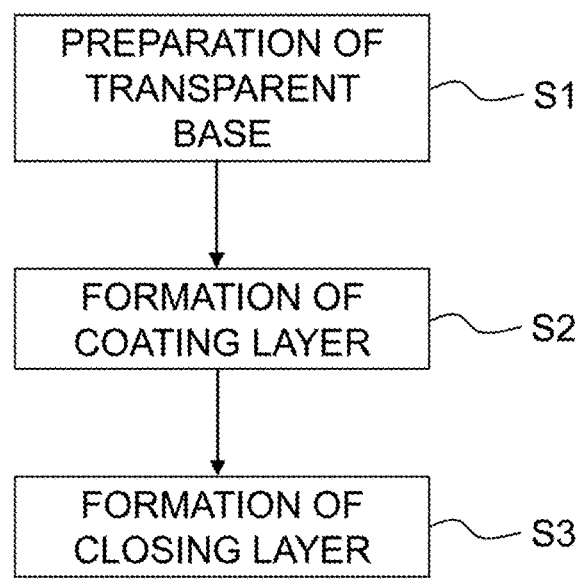
FIG. 2 is a flowchart indicating a method for manufacturing the optical phase difference component of the embodiment.

The following explanation will be made on a method for manufacturing the optical phase difference component 100 depicted in FIG. 1A by use of the roll process apparatus 200. As indicated in FIG. 2, the method for manufacturing the optical phase difference component mainly includes a step S1 of preparing the transparent base with the concave-convex pattern, a step S2 of forming the coating layer that coats surfaces of concave portions and convex portions of the concave-convex pattern, and a step S3 of forming the closing layer on the concave-convex pattern of the transparent base. There is no need that the method for manufacturing the optical phase difference component according to the present invention include the step S2 of forming the coating layer. Namely, the step S2 of forming the coating layer is not an indispensable element for the method for manufacturing the optical phase difference component according to the present invention.

<Step of Preparing Transparent Base>

In the method for manufacturing the optical phase difference component of the embodiment, the transparent base with the concave-convex pattern is prepared as follows (step S1 of FIG. 2). In the roll process apparatus 200 depicted in FIG. 3, rotation of the film feeding roll 172 feeds the film-shaped substrate 42 wound around the film feeding roll 172 to a downstream side. The film-shaped substrate 42 is transported to the coating unit 140 and coated with the UV curable resin 50a having a predefined thickness by use of the die coater 182.

As a method for coating the substrate 42 with the UV curable resin 50a, instead of the die coating method, it is possible to adopt, for example, various coating methods such as the bar coating method, spin coating method, spray coating method, dip coating method, dropping method, gravure printing method, screen printing method, relief printing method, die coating method, curtain coating method, ink-jet method, and sputtering method. Among them, the bar coating method, die coating method, gravure printing method and spin coating methods are preferably used because a substrate having a relatively large area can be coated uniformly with the UV curable resin 50a.

In order to improve the adhesion property between the substrate 42 and the UV curable resin 50a, a surface modified layer may be provided on the substrate 42 before the substrate 42 is coated with the UV curable resin 50a. Examples of materials of the surface modified layer include silane monomer such as n-octyltriethoxysilane, methyltriethoxysilane, and methyltrimethoxysilane; vinylsilane such as vinyltriethoxysilane, vinyltrimethoxysilane, vinyltris(2-methoxyethoxy)silane, and vinylmethyldimethoxysilane; methacrylsilane such as 3-methacryloxypropyltriethoxysilane and 3-methacryloxypropyltrimethoxysilane; epoxysilane such as 2-(3,4-epoxycyclohexyl) ethyltrimethoxysilane, 3-glycidoxypropyltrimethoxysilane, and 3-glycidoxypropyltriethoxysilane; mercaptosilane such as 3-mercaptopropyltrimethoxysilane and 3-mercaptopropyltriethoxysilane; sulfursilane such as 3-octanoylthio-1-propyltriethoxysilane; aminosilane such as 3-aminopropyltriethoxysilane, 3-aminopropyltrimethoxysilane, N-(2-aminoethyl)-3-aminopropyltrimethoxysilane, N-(2-aminoethyl)-3-aminopropylmethyldimethoxysilane, and 3-(N-phenyl)-aminopropyltrimethoxysilane; and polymers obtained by polymerizing the monomers as described above. A titanium coupling agent may be used instead of the above silane coupling agents. Alternatively, a surface modified layer may be provided in such a manner that the surface of the substrate 42 is subjected to treatment with an energy ray, such as plasma treatment, corona treatment, excimer irradiation treatment, or UV/$O_3$ treatment.

The film-shaped substrate 42 coated with the UV curable resin 50a by the coating unit 140 is transported to the transfer unit 160. In the transfer unit 160, the film-shaped substrate 42 is pressed (urged) against the transfer roll 170 by use of the nip roll 174, so that the concave-convex pattern of the transfer roll 170 is transferred to the UV curable resin 50a, and at the same time or immediately after the above, the radiation light source 185, which is disposed to face the transfer roll 170 with the film-shaped substrate 42 intervening therebetween, emits UV light to the UV curable resin 50a, thus curing the UV curable resin 50a. The cured UV curable resin and the film-shaped substrate 42 are peeled off from the transfer roll 170 by use of the peeling roll 176. Accordingly, the transparent base 40 with the concave-convex structure layer 50 (see FIG. 1A) to which the concave-convex pattern of the transfer roll 170 has been transferred is obtained.

The transparent base with the concave-convex pattern may be manufactured by an apparatus other than the roll process apparatus depicted in FIG. 3. The transparent base with the concave-convex pattern is not required to be self-manufactured, and it may be obtained through a manufacturer such as a market and film manufacturer.

<Step of Forming Coating Layer>

Subsequently, the transparent base 40 with the concave-convex pattern is transported to the film formation unit 180, and the coating layer 30 (see FIG. 1A), which coats surfaces of concave portions and convex portions of the concave-convex pattern of the transparent base 40, is formed (step S2 of FIG. 2). In the roll process apparatus 200 depicted in FIG. 3, the transparent base 40 peeled from the transfer roll 170 is transported directly into the sputtering device 10 via the guide roll 175. The transparent base 40 peeled from the transfer roll 170, however, may be rolled into a roll, and the obtained rolled transparent base 40 may be transported into the sputtering device 10.

The following explanation will be made on a method for forming the coating layer 30 (see FIG. 1A) that is formed by, for example, metal oxide with the sputtering device 10 depicted in FIG. 3. At first, pressure in the vacuum chamber 11 is reduced to high vacuum. Then, metal atoms (and oxygen atoms) are sputtered from the sputtering target by DC plasma or high-frequency plasma while noble gas, such as Ar, and oxygen gas are being introduced into the vacuum chamber 11. The metal atoms sputtered from the sputtering target 18 react with oxygen on the surface of the transparent base 40 to cause deposition of metal oxide, while the transparent base 40 is being transported in the vacuum chamber 11. Accordingly, the coating layer 30 (see FIG. 1A) is formed on the transparent base 40, along the concave-convex pattern 80 to coat surfaces of the convex portions 60 and concave portions 70 of the concave-convex pattern 80 of the transparent base 40.

<Step of Forming Closing Layer>

Next, the closing layer 20 (see FIG. 1A) is formed on the transparent base 40 (step S3 of FIG. 2). The closing layer 20 can be formed continuously from the formation of the coating layer 30 with the sputtering device 10 used in the step S2 of forming the coating layer. When the closing layer 20 is made from the same metal oxide as the coating layer 30, metal oxide can be further deposited on the transparent base 40 by performing sputtering continuously after formation of the coating layer 30. In that situation, the sputtered metal atoms are not likely to reach gaps between adjacent convex portions 60 (see FIG. 1A) of the concave-convex pattern 80 on the transparent base 40, in particular, the sputtered metal atoms are not likely to reach lower (substrate-side) side surfaces of the convex portions 60 of the concave-convex pattern 80 on the transparent base 40. Namely, most of the metal atoms adhere to upper surfaces and upper side surfaces of the convex portions 60. Thus, the deposition amount of metal oxide on the upper parts (upper surfaces and upper side surfaces) of the convex portions 60 is larger than that on the concave portions 70 and the lower side surfaces of the convex portions 60. Accordingly, performing sputtering continuously allows the metal oxide deposited on the upper parts of adjacent convex portions 60 to connect with each other to form the closing layer before gaps between adjacent convex portions 60 are filled with the deposited metal oxide, thus forming the gaps 90 between adjacent convex portions 60. The gaps 90 are closed by the concave-convex pattern 80 and the closing layer 20. Especially, when the upper surface of each convex portion 60 is a surface parallel to the substrate 42, i.e., a surface parallel to the sputtering target 18 (for example, when the cross-sectional structure in a plane orthogonal to the extending direction of each convex portion 60 has a trapezoidal shape), the metal oxide is much more likely to be deposited on the upper surfaces of the convex portions 60 than on other portions. This can reduce the deposition time that is required for connecting the metal oxide deposited on the upper parts of adjacent convex portions 60 to form the closing layer 20, and also reduce material (target) consumption.

The target for coating layer formation and the target for closing layer formation may be respectively provided in the vacuum chamber 10. For example, voltage to be applied on the target for closing layer formation may be higher than voltage to be applied on the target for coating layer formation, thus making the deposition rate at the time of closing layer formation faster than the deposition rate at the time of coating layer formation. Making the deposition rate at the time of closing layer formation high allows the metal oxide to be deposited on the upper parts of the convex portions 60 more preferentially. This can reduce the deposition time that is required for connecting the metal oxide deposited on the upper parts of adjacent convex portions 60 to form the closing layer 20, and also reduce material (target) consumption.

The material of the closing layer 20 may be different from that of the coating layer 30. In that case, a target made from a material corresponding to the closing layer 20 and a target made from a material corresponding to the coating layer 30 may be provided in the vacuum chamber 10. For example, $TiO_2$ or the like, which is a high refractive index material, may be used as the target for the coating layer 30, and ITO or the like, which is a material of which deposition rate is faster, may be used as the material for the closing layer 20. In that case, the coating layer 30 to be formed has a high refractive index, and thus the optical phase difference component to be manufactured can generate a great phase difference. Further, making the deposition rate at the time of closing layer formation faster allows the metal oxide to be deposited on the upper parts of the convex portions 60 more preferentially. This can reduce the deposition time that is required for connecting the metal oxide deposited on the upper parts of adjacent convex portions 60 to form the closing layer 20, and also reduce material (target) consumption. When the closing layer 20 and the coating layer 30 are formed under mutually different atmospheres, the coating layer may be formed in a vacuum chamber for coating layer formation and the closing layer may be formed in a vacuum chamber for closing layer formation. It is not indispensable that the closing layer 20 and the coating layer 30 be formed by the same film formation method; rather, the closing layer 20 and the coating layer 30 may be formed by appropriately combining the sputtering, evaporation deposition described later, CVD described later, and the like. For example, the closing layer 20 may be formed by a process of which deposition rate is faster than that of the coating layer 30. In that case also, the coating layer may be formed in the vacuum chamber for coating layer formation and the closing layer may be formed in the vacuum chamber for closing layer formation.

The coating layer 30 and closing layer 20 may be formed by a publicly known dry process, such as a physical vapor deposition method (PVD) including evaporation and the like or a chemical vapor deposition method (CVD), instead of the sputtering described above. For example, when metal oxide film(s) is/are formed as the coating layer 30 and/or the closing layer 20 on the transparent base 40 by an electron beam heating evaporation method, it is possible to use, for example, an electron beam heating evaporation apparatus configured as follows. Namely, in a vacuum chamber, there are provided a crucible that contains metal or metal oxide and is disposed to face a transport path of the transparent base 40 and an electron gun that irradiates the interior of the crucible with an electron beam to evaporate metal or metal oxide. In that configuration, the metal or metal oxide in the crucible may be heated and evaporated by the electron beam while the transparent base 40 is being transported, so that metal oxide can be deposited on the transparent base 40 being transported. In that situation, it is allowable to or not to introduce oxygen gas into the chamber depending on the degree of oxidation of the material contained in the crucible and a targeted degree of oxidation of the coating layer and/or the closing layer.

When the metal oxide film(s) is/are formed as the coating layer 30 and/or the closing layer 20 on the transparent base 40 by atmospheric-pressure plasma CVD, it is possible to use methods described, for example, in Japanese Patent Application Laid-open Nos. 2004-052028 and 2004-198902. An organometallic compound may be used as a raw material compound, and the raw material compound may be in either a gaseous, liquid, or solid state at normal temperature under normal pressure. When the raw material compound is used in its gaseous state, the raw material compound can be introduced as it is into a discharge space; on the other hand, when the raw material compound is in a liquid or solid state, the material is used after being gasified once by means of heating, bubbling, decompression, ultrasonic radiation, etc. In view of such a situation, for example, a metal alkoxide of which boiling point is not more than 200° C. is preferably used as the organometallic compound.

Examples of such metal alkoxide include a silicon compound such as silane, tetramethoxysilane, tetraethoxysilane (TEOS), and tetra-n-propoxysilane; a titanium compound such as titanium methoxide, titanium ethoxide, titanium isopropoxide, and titanium tetraisopropoxide; a zirconium compound such as zirconium-n-propoxide; an aluminum compound such as aluminum ethoxide, aluminum triisopropoxide, and aluminum isopropoxide; antymony ethoxide; arsenic triethoxide; zinc acetylacetonate; and diethylzinc.

Further, cracking gas is used together with the gaseous raw material containing these organometallic compounds to compose a reactive gas, for the purpose of cracking the organometallic compounds to thereby obtain an inorganic compound. The cracking gas is exemplified, for example, by hydrogen gas, methane gas, acetylene gas, carbon monoxide gas, carbon dioxide gas, nitrogen gas, ammonia gas, nitrous oxide gas, nitrogen oxide gas, nitrogen dioxide gas, oxygen gas, water vapor, fluorine gas, hydrogen fluoride, trifluoro alcohol, trifluorotoluene, hydrogen sulfide, sulfur dioxide, carbon bisulfide, and chlorine gas. For example, metal oxide can be formed by using oxygen gas, metal nitride can be formed by using ammonia gas, and metal oxynitride can be formed by using ammonia gas and nitrous oxide gas.

In the plasma CVD method, a discharge gas easily turned to a plasma state is mainly mixed with the reactive gas. As the discharge gas, it is possible to use a nitrogen gas; a rare gas such as a gas of an element of the eighteenth group of the periodic table, specifically, helium, neon, argon, etc.; and the like. In particular, the nitrogen gas is preferably used in view of the production cost.

The film formation is performed by mixing the discharge gas with the reactive gas to thereby obtain a mixed gas, and by supplying the mixed gas to a discharge plasma generating apparatus (plasma generator). The ratio of the discharge gas relative to the reactive gas is different depending on the property of a film as an object to be formed, and the percentage of the discharge gas in the entire mixed gas is not less than 50%.

For example, silicon alkoxide (such as tetraethoxysilane (TEOS)), which is one of the metal alkoxides having a boiling point of not more than 200° C., is used as the raw material compound, oxygen is used as the cracking gas, and the rare gas or an inert gas such as nitrogen is used as the discharge gas, and the plasma discharge is performed. Thus, it is possible to form a film of silicon oxide.

In the CVD method as described above, it is possible to deposit any one of metal carbide, metal nitride, metal oxide, metal sulfide, metal halide, or mixtures thereof (e.g., metal oxynitride, metal oxide halide, and metal nitride carbide) by selecting conditions such as the metal compound as the raw material, cracking gas, decomposition temperature, and power to be inputted or supplied. Thus, the film is preferably obtained by the CVD method.

As described above, the optical phase difference component 100 as depicted in FIG. 1A is obtained. The optical phase difference component 100 obtained may be wound around the winding roll 178. The optical phase difference component 100 may pass through the guide roll 175 or the like on the way, as appropriate. The protective component may adhere to the surface, of the transparent base 40, opposite to the surface with the concave-convex pattern 80 and/or the closing layer. This prevents the optical phase difference component 100 from being damaged or scarred when the obtained optical phase difference component 100 is transported or conveyed.

Although the transfer roll is used as the mold for transferring the concave-convex pattern to the UV curable resin in the above embodiment, a long film-shaped mold, plate-shaped mold, or the like may be pressed against the UV curable resin applied on the substrate to form the concave-convex pattern.

Although the concave-convex structure layer 50 is made from the UV curable resin in the above embodiment, the concave-convex structure layer 50 may be made from, for example, a thermoplastic resin, thermosetting resin, or inorganic material. When the concave-convex structure layer 50 is made from the inorganic material, the transparent base 40 can be prepared, for example, by a method of coating a mold with a precursor of the inorganic material and curing the coating film; a method of coating a mold with a dispersion liquid of fine particles and drying the dispersion medium; a method of coating a mold with a resin material and curing the coating film; or a liquid phase deposition (LPD) method.

As a precursor of the inorganic material, alkoxide, such as silicon alkoxide or titanium alkoxide, or the like, may be used (sol-gel method). For example, when the concave-convex structure layer 50 made from silica is formed on the substrate, it is possible to use, as the precursor of silica (silica precursor), tetraalkoxide monomers represented by tetraalkoxysilane such as tetramethoxysilane (TMOS), tetraethoxysilane (TEOS), tetra-i-propoxysilane, tetra-n-propoxysilane, tetra-i-butoxysilane, tetra-n-butoxysilane, tetra-sec-butoxysilane, and tetra-t-butoxysilane; trialkoxide monomers represented by trialkoxysilane such as methyl trimethoxysilane, ethyl trimethoxysilane, propyl trimethoxysilane, isopropyl trimethoxysilane, phenyl trimethoxysilane, methyl triethoxysilane (MTES), ethyl triethoxysilane, propyl triethoxysilane, isopropyl triethoxysilane, phenyl triethoxysilane, methyl tripropoxysilane, ethyl tripropoxysilane, propyl tripropoxysilane, isopropyl tripropoxysilane, phenyl tripropoxysilane, methyl triisopropoxysilane, ethyl triisopropoxysilane, propyl triisopropoxysilane, isopropyl triisopropoxysilane, phenyl triisopropoxysilane, and tolyltriethoxysilane; dialkoxide monomers represented by dialkoxysilane such as dimethyl dimethoxysilane, dimethyl diethoxysilane, dimethyl dipropoxysilane, dimethyl diisopropoxysilane, dimethyl di-n-butoxysilane, dimethyl di-i-butoxysilane, dimethyl di-sec-butoxysilane, dimethyl di-t-butoxysilane, diethyl dimethoxysilane, diethyl diethoxysilane, diethyl dipropoxysilane, diethyl diisopropoxysilane, diethyl di-n-butoxysilane, diethyl di-i-butoxysilane, diethyl di-sec-butoxysilane, diethyl di-t-butoxysilane, dipropyl dimethoxysilane, dipropyl diethoxysilane, dipropyl dipropoxysilane, dipropyl diisopropoxysilane, dipropyl di-n-butoxysilane, dipropyl di-i-butoxysilane, dipropyl di-sec-butoxysilane, dipropyl di-t-butoxysilane, diisopropyl dimethoxysilane, diisopropyl diethoxysilane, diisopropyl dipropoxysilane, diisopropyl diisopropoxysilane, diisopropyl di-n-butoxysilane, diisopropyl di-i-butoxysilane, diisopropyl di-sec-butoxysilane, diisopropyl di-t-butoxysilane, diphenyl dimethoxysilane, diphenyl diethoxysilane, diphenyl dipropoxysilane, diphenyl diisopropoxysilane, diphenyl di-n-butoxysilane, diphenyl di-i-butoxysilane, diphenyl di-sec-butoxysilane, diphenyl di-t-butoxysilane, etc. Further, it is also possible to use alkyltrialkoxysilane and dialkyldialkoxysilane in each of which an alkyl group has carbon numbers of C4 to C18. It is also allowable to use metal alkoxide such as: monomers having vinyl group such as vinyltrimethoxysilane and vinyltriethoxysilane; monomers having epoxy group such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane; monomers having styryl group such as p-styryltrimethoxysilane; monomers having methacrylic group such as 3-methacryloxypropylmethyldimethoxysilane, 3-methacryloxypropyltrimethoxysilane, 3-methacryloxypropylmethyldiethoxysilane, and 3-methacryloxypropyltriethoxysilane; monomers having acrylic group such as 3-acryloxypropyltrimethoxysilane; monomers having amino group such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane; monomer having ureide group such as 3-ureidepropyltriethoxysilane; monomers having mercapto group such as 3-mercaptopropylmethyldimethoxysilane and 3-mercaptopropyltrimethoxysilane; monomers having sulfide group such as bis(triethoxysilylpropyl) tetrasulfide; monomers having isocyanate group such as 3-isocyanatopropyltriethoxysilane; polymers obtained by polymerizing the foregoing monomers in small amounts; and composite materials characterized in that functional group and/or polymer is/are introduced into a part of the material as described above. Further, a part of or all of the alkyl group and the phenyl group of each of these compounds may be substituted with fluorine. Further, examples of the silica precursor include metal acetylacetonate, metal carboxylate, oxychloride, chloride, and mixtures thereof. The silica precursor, however, is not limited to these. In addition to Si, examples of the metal species include Ti, Sn, Al, Zn, Zr, In, and mixtures thereof, but are not limited thereto. It is also possible to use any appropriate mixture of precursors of the oxides of the above metals. Further, it is possible to use, as the silica precursor, a silane coupling agent having, in its molecule, a hydrolysis group having the affinity and the reactivity with silica and an organic functional group having the water-repellence. For example, the silane coupling agent is exemplified by silane monomer such as n-octyltriethoxysilane, methyltriethoxysilane, and methyltrimethoxysilane; vinylsilane such as vinyltriethoxysilane, vinyltrimethoxysilane, vinyltris(2-methoxyethoxy)silane, and vinylmethyldimethoxysilane; methacrylsilane such as 3-methacryloxypropyltriethoxysilane and 3-methacryloxypropyltrimethoxysilane; epoxysilane such as 2-(3,4-epoxycyclohexyl)ethyltrimethoxysilane, 3-glycidoxypropyltrimethoxysilane, and 3-glycidoxypropyltriethoxysilane; mercaptosilane such as 3-mercaptopropyltrimethoxysilane and 3-mercaptopropyltriethoxysilane; sulfursilane such as 3-octanoylthio-1-propyltriethoxysilane; aminosilane such as 3-aminopropyltriethoxysilane, 3-aminopropyltrimethoxysilane, N-(2-aminoethyl)-3-aminopropyltrimethoxysilane, N-(2-aminoethyl)-3-aminopropylmethyldimethoxysilane, and 3-(N-phenyl)-aminopropyltrimethoxysilane; polymers obtained by polymerizing the monomers as described above; and the like.

When a mixture of TEOS and MTES is used as the precursor of the inorganic material, the mixture ratio thereof can be, for example, 1:1 in a molar ratio. The precursor produces amorphous silica by being subjected to hydrolysis and polycondensation reaction. An acid such as hydrochloric acid or an alkali such as ammonia is added in order to adjust the pH of the solution as a synthesis condition. The pH is preferably not more than 4 or not less than 10. Water may be added to perform the hydrolysis. The amount of water to be added can be not less than 1.5 times, with respect to the amount of metal alkoxide species, in the molar ratio.

Examples of a solvent of the precursor solution used in the sol-gel method include alcohols such as methanol, ethanol, isopropyl alcohol (IPA), and butanol; aliphatic hydrocarbons such as hexane, heptane, octane, decane, and cyclohexane; aromatic hydrocarbons such as benzene, toluene, xylene, and mesitylene; ethers such as diethyl ether, tetrahydrofuran, and dioxane; ketones such as acetone, methyl ethyl ketone, isophorone, and cyclohexanone; ether alcohols such as butoxyethyl ether, hexyloxyethyl alcohol, methoxy-2-propanol, and benzyloxyethanol; glycols such as ethylene glycol and propylene glycol; glycol ethers such as ethylene glycol dimethyl ether, diethylene glycol dimethyl ether, and propylene glycol monomethyl ether acetate; esters such as ethyl acetate, ethyl lactate, and γ-butyrolactone; phenols such as phenol and chlorophenol; amides such as N,N-dimethylformamide, N,N-dimethylacetamide, and N-methylpyrrolidone; halogen-containing solvents such as chloroform, methylene chloride, tetrachloroethane, monochlorobenzene, and dichlorobenzene; hetero-element containing compounds such as carbon disulfide; water; and mixture solvents thereof. Especially, ethanol and isopropyl alcohol are preferable. Further, a mixture of water and ethanol and a mixture of water and isopropyl alcohol are also preferable.

As an additive of the precursor solution used in the sol-gel method, it is possible to use polyethylene glycol, polyethylene oxide, hydroxypropylcellulose, and polyvinyl alcohol for viscosity adjustment; alkanolamine such as triethanolamine, β-diketone such as acetylacetone, β-ketoester, formamid, dimetylformamide, dioxane, and the like, as a solution stabilizer. Further, as an additive of the precursor solution, it is possible to use a material which can generate an acid or alkali by being irradiated with energy rays represented by ultraviolet rays such as excimer UV light. By adding such a material, the precursor solution can be gelled (cured) by being irradiated with light, thereby making it possible to form the inorganic material.

Or, polysilazane may be used as the precursor of the inorganic material. The polysilazane is oxidized by being heated or being irradiated with an energy ray such as excimer, is thereby ceramicized (subjected to silica reforming or modification) and forms silica, SiN or SiON. Note that the "polysilazane" is a polymer having a silicon-nitrogen bond, is an inorganic polymer comprising Si—N, Si—H, N—H, or the like, and is a precursor of a ceramics such as $SiO_2$, $Si_3N_4$, or $SiO_XN_Y$, which is an intermediate solid solution of such a ceramics. A compound, which is ceramized at relatively low temperature and is modified into silica or the like, as that represented by the following general formula (1) described in Japanese Patent Application Laid-open No. H08-112879, is more preferable.

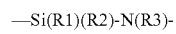  General formula (1):

In the general formula (1), R1, R2, and R3 each represent a hydrogen atom, an alkyl group, an alkenyl group, a cycloalkyl group, an aryl group, an alkylsilyl group, an alkylamino group, or an alkoxy group.

Among the compounds represented by the general formula (1), perhydropolysilazane (referred to also as PHPS) in which all of R1, R2, and R3 are hydrogen atoms and organopolysilazane in which a part of the hydrogen bonded to Si thereof is substituted by, for example, an alkyl group are particularly preferable.

As other examples of the polysilazane ceramized at low temperature, it is also possible to use: silicon alkoxide-added polysilazane obtained by reacting polysilazane with silicon alkoxide (for example, Japanese Patent Laid-Open No. 5-238827); glycidol-added polysilazane obtained by reaction with glycidol (for example, Japanese Patent Laid-open No. 6-122852); alcohol-added polysilazane obtained by reaction with alcohol (for example, Japanese Patent Laid-open No. 6-240208); metal carboxylate-added polysilazane obtained by reaction with metal carboxylate (for example, Japanese Patent Laid-Open No. 6-299118); acetylacetonato complex-added polysilazane obtained by reaction with an acetylacetonato complex containing a metal (for example, Japanese Patent Laid-Open No. 6-306329); metallic fine particles-added polysilazane obtained by addition of metallic fine particles (for example, Japanese Patent Laid-Open No. 7-196986), and the like.

As the solvent of the polysilazane solution, it is possible to use hydrocarbon solvents such as aliphatic hydrocarbons, alicyclic hydrocarbons, and aromatic hydrocarbons; halogenated hydrocarbon solvents; and ethers such as aliphatic ethers and alicyclic ethers. Amine or a metal catalyst may be added in order to promote the modification into a silicon oxide compound.

The substrate is coated with the solution of the precursor of the inorganic material, such as metal alkoxide or polysilazane, and then the coating film of the precursor is heated or irradiated with energy rays while a mold having a concave-convex pattern is pressed against the coating film of the precursor, thus causing gelation of the coating film. Accordingly, the concave-convex structure layer that is made from the inorganic material and to which the concave-convex pattern of the mold has been transferred is obtained.

The transparent base 40a, as depicted in FIG. 1B, in which structures forming convex portions 60a are formed on the substrate 42a and areas (concave portions 70a) where the surface of the substrate 42a is exposed are defined between convex portions 60a can be manufactured, for example, as follows. Instead of coating the substrate 42 with the UV curable resin 50a in the manufacturing method of the above embodiment, only the concave portions of the mold for concave-convex pattern transfer are coated with UV curable resin. The UV curable resin coating the concave portions of the mold is brought in tight contact with the substrate 42a, thus transferring the UV curable resin to the substrate 42a. Accordingly, the convex portions 60a having a shape corresponding to the shape of the concave portions of the mold are formed on the substrate 42a. The concave portions 70a (areas where the surface of the substrate 42a is exposed) are defined between the convex portions 60 formed as described above.

The transparent base 40b, as depicted in FIG. 1C, in which a substrate surface itself forms convex portions 60b and concave portions 70b, can be manufactured, for example, as follows. A resist layer having a concave-convex pattern is formed on a substrate by publicly known technology, such as nanoimprint or photolithography. Concave portions of the resist layer are etched to expose a surface of the substrate, and then the substrate is etched with using a remaining resist layer as a mask. After etching, a residual mask (resist) is removed by a medicinal solution. Accordingly, concavities and convexities can be formed on the substrate surface itself.

The coating layer 30 and the closing layer 20 are formed on each of the transparent bases 40a and 40b manufactured as described above by the method similar to the above embodiment, thus forming each of the optical phase difference component 100a depicted in FIG. 1B and the optical phase difference component 100b depicted in FIG. 1C.

[Composite Optical Component]

Figure 4:
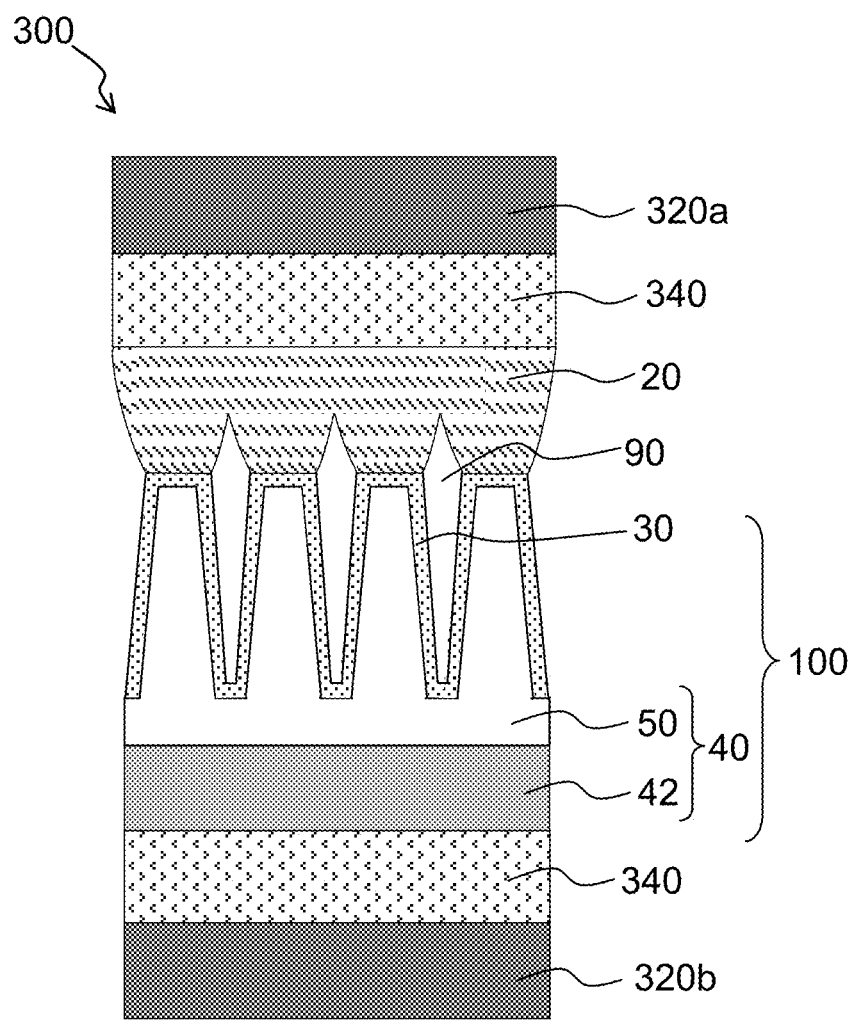
FIG. 4 is a schematic cross-sectional view of a display device including the optical phase difference component of the embodiment.
Figure 6:
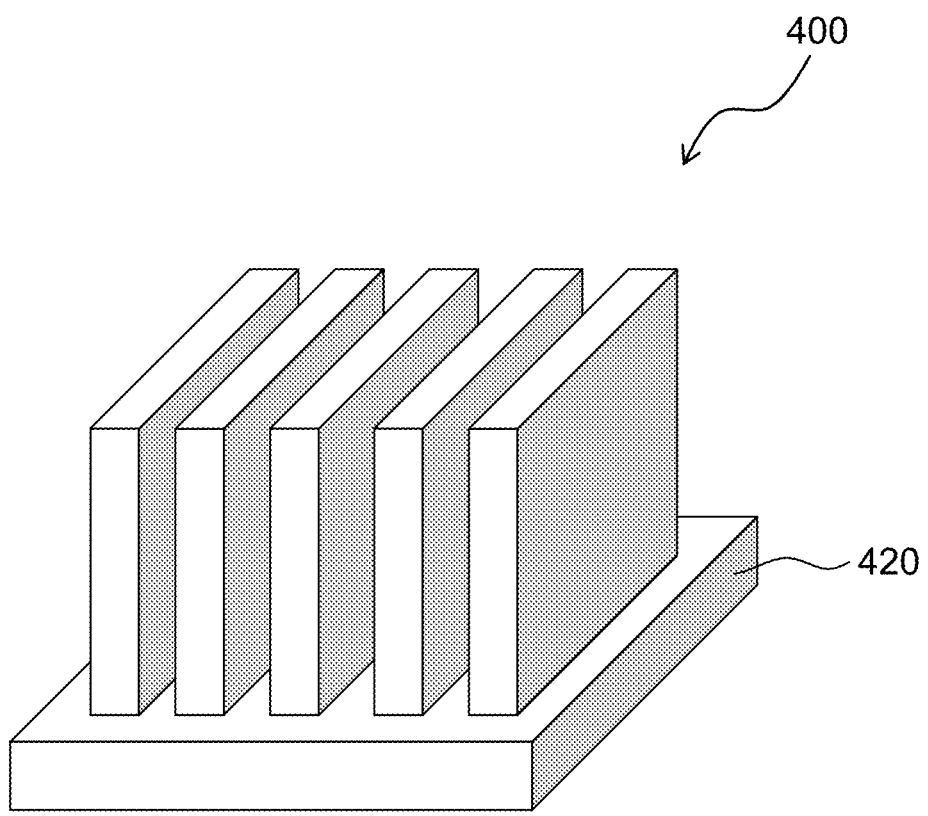
FIG. 6 schematically depicts an exemplary optical phase difference component of conventional technology.

The following explanation will be made on a composite optical component formed by using any one of the optical phase difference components 100, 100a, and 100b. As depicted in FIG. 4, a composite optical component 300 is configured by the optical phase difference component 100 of the above embodiment, and optical components 320a and 320b joined to the optical phase difference component 100. In the composite optical component 300, the optical component 320a is joined (adheres) to the closing layer 20 of the optical phase difference component 100, and the optical component 320b is joined to the surface, of the transparent base 40, opposite to the surface with the concave-convex pattern. The composite optical component according to the present invention is not required to include both the optical components 320a and 320b, namely, any one of the optical components 320a and 320b may be provided in the composite optical component according to the present invention. For example, the composite optical component, in which a polarization plate as the optical component 320a or 320b adheres to the optical phase difference component 100, may be used as an antireflection film. By allowing an optical phase difference component side of the antireflection film to adhere to a display element such as an organic EL element (organic Electro-Luminescence element or organic light emitting diode), liquid crystal element, it is possible to obtain a display device (e.g., an organic EL display or liquid crystal display) that is not likely to cause reflection of wiring electrodes of the display element.

Adhesive is used to join the optical phase difference component to the optical components such as the polarization plate and display element. As the adhesive, any publicly known adhesive, such as acrylic-based or silicone-based adhesive, may be used. In the optical phase difference component of the embodiment, the gaps between convex portions are closed by or covered with the closing layer. This prevents the adhesive from entering the gaps between convex portions. Therefore, the phase difference generated by the optical phase difference component remain unchanged after the optical phase difference component is joined to the optical components, and thus the optical phase difference component can generate a sufficient phase difference.

EXAMPLES

In the following description, the optical phase difference component according to the present invention will be specifically explained with examples and comparative examples. The present invention, however, is not limited to the examples and comparative examples. In Examples 1 to 3 and Comparative Examples 1 and 2, optical phase difference components were manufactured, respectively. Then, regarding each of the optical phase difference components, evaluation for the load-bearing property and evaluation for phase difference properties before and after adhesion to another component were performed.

Example 1

As the mold for concave-convex pattern transfer, a mold obtained by performing electron beam processing on a Si wafer was prepared. The mold was formed with a concave-convex pattern in which the cross-sectional shape of each of convex portions in a plane orthogonal to its extending direction was a substantially isosceles triangle having a base length of 180 nm and a height of 420 nm, and the convex portions extended linearly to have an extending length of 15 mm and were arrayed at 270 nm pitches.

Subsequently, a substrate (T80SZ produced by FUJIFILM Corporation) was coated with a fluorine-based UV curable resin. The fluorine-based UV curable resin was cured by irradiation with ultraviolet light at 600 mJ/cm$^2$ while the mold was pressed thereagainst. After curing of the resin, the mold was exfoliated or peeled off from the cured resin. Accordingly, the transparent base with the concave-convex pattern, which was made from the UV curable resin and to which the surface profile (surface shape) of the mold was transferred, was obtained. The transparent base was formed with the concave-convex pattern in which convex portions extending linearly to have an upper part width of 90 nm, lower part width of 270 nm, height of 420 nm, and extending length of 15 mm were arrayed at 270 nm pitches. The cross-sectional shape of each convex portion in a plane orthogonal to its longitudinal direction was a substantially isosceles trapezoid having an upper base of 90 nm, lower base of 270 nm, and height of 420 nm. The refractive index of the cured fluorine-based UV curable resin was 1.5.

$TiO_2$ was deposited on the transparent base manufactured as described above by DC sputtering to form a $TiO_2$ film. DC power was 1000 W. A mixed gas obtained by mixing Ar with 2 vol % of $O_2$ was used as sputtering gas. The mixed gas was introduced into a sputtering chamber at a flow late of 50 sccm and gas pressure in the chamber was set to 0.5 Pa. The temperature of the transparent base at the time of deposition was set to 25 degrees. The deposition rate of $TiO_2$ was approximately 5 nm/min. The sputtering deposition was performed until a $TiO_2$ film thickness reached 450 nm. Here, the $TiO_2$ film thickness means the thickness of the $TiO_2$ film deposited on the upper surface of each convex portion of the transparent base. In the optical phase difference component obtained as described above, the $TiO_2$ film having a thickness in a range of 50 to 100 nm was formed on a side surface of each convex portion of the transparent base as the coating layer, and the $TiO_2$ film having a thickness of 420 nm was formed as the closing layer. The $TiO_2$ films on adjacent convex portions were connected to each other to form a continuous film. Namely, the closing layer configured by the TiO₂ film was formed. Gaps closed by side surfaces of adjacent convex portions and the closing layer were formed between the adjacent convex portions. The height of the gaps was 440 nm. The refractive index of the TiO₂ film was 2.5. Accordingly, the optical phase difference component as depicted in FIG. 1A was obtained.

Example 2

The optical phase difference component was manufactured in a similar manner to that in Example 1, except that the TiO₂ film thickness was 200 nm and ITO was deposited on the TiO₂ film to form an ITO film. ITO was deposited by DC sputtering. DC power was 1000 W. The mixed gas obtained by mixing Ar with 2 vol % of O₂ was used as sputtering gas. The mixed gas was introduced into a sputtering chamber at a flow late of 50 sccm and gas pressure in the chamber was set to 0.5 Pa. The temperature of the transparent base at the time of deposition was set to 25 degrees. The deposition rate of ITO was approximately 50 nm/min. The sputtering deposition was performed until the ITO film thickness reached 250 nm. Here, the ITO film thickness means the thickness of the ITO film stacked on the TiO₂ film formed on the upper surface of each convex portion of the transparent base.

In the optical phase difference component obtained as described above, the TiO₂ film having a thickness in a range of 50 to 100 nm was formed on each side surface of each convex portion of the transparent base as the coating layer, and a film composed of the TiO₂ film and ITO film and having a thickness of 420 nm was formed as the closing layer. The TiO₂ films and ITO films on adjacent convex portions were connected to each other to form a continuous film. Namely, the closing layer configured by the TiO₂ film and ITO film was formed. Gaps closed by side surfaces of adjacent convex portions and the closing layer were formed between the adjacent convex portions. The height of the gaps was 440 nm. The refractive index of the TiO₂ film was 2.5, and the refractive index of the ITO film was 1.9. Accordingly, the optical phase difference component as depicted in FIG. 1A was obtained.

Example 3

As the mold for concave-convex pattern transfer, a mold obtained by performing electron beam processing on a Si wafer was prepared. The mold was formed with a concave-convex pattern in which convex portions extending linearly to have an upper part width of 90 nm, lower part width of 270 nm, height of 420 nm, and extending length of 15 mm were arrayed at 270 nm pitches. The cross-sectional shape of each convex portion in a plane orthogonal to its longitudinal direction was a substantially isosceles trapezoid having an upper base of 90 nm, lower base of 270 nm, and height of 420 nm.

Subsequently, a PET substrate (COSMOSHINE A-4100 manufactured by TOYOBO CO., LTD.) was coated with a fluorine-based UV curable resin. The fluorine-based UV curable resin was cured by irradiation with ultraviolet light at 600 mJ/cm² while the mold was pressed thereagainst. After curing of the resin, the mold was exfoliated or peeled off from the cured resin. Accordingly, a film-shaped mold with a concave-convex pattern to which the surface profile (surface shape) of the mold was transferred, was obtained. The film-shaped mold was formed with the concave-convex pattern in which the cross-sectional shape of each of the convex portions in a plane orthogonal to its extending direction was a substantially isosceles triangle having a base length of 180 nm and a height of 420 nm, and the convex portions extended linearly to have an extending length of 15 mm and were arrayed at 270 nm pitches.

In order to form the concave-convex structure layer by the sol-gel method, a solution of a precursor of an inorganic material (sol-gel material solution) was prepared by the following manner. Namely, 0.75 mol of tetraethoxysilane (TEOS) and 0.25 mol of dimethyldiethoxysilane (DMDES) were added by dropping to a liquid obtained by mixing 22 mol of ethanol, 5 mol of water, 0.004 mol of concentrated hydrochloric acid and 4 mol of acetylaceton. Further, as an additive, 0.5 wt % of a surfactant S-386 (manufactured by SEIMI CHEMICAL CO., LTD) was added, followed by being stirred for two hours at a temperature of 23° C. and a humidity of 45%, and thus a precursor solution of SiO₂ was obtained. The precursor solution was applied onto a substrate by means of bar coating, thereby forming a coating film of the precursor solution. As the substrate, an alkali-free glass substrate of which size was 100 mm×100 mm×0.7 mm (thickness) and of which refractive index was 1.517 (λ=589 nm) (OA10GF produced by Nippon Electric Glass Co., Ltd.) was used. Doctor Blade (manufactured by YOSHIMITSU SEIKI CO., LTD.) was used as a bar coater. The doctor blade was designed to form a coating film having a thickness of 5 μm. However, the doctor blade was adjusted to form a coating film having a thickness of 40 μm by sticking an imide tape having a thickness of 35 μm to the doctor blade.

After leaving the coating film of the precursor solution for one minute at a temperature of 25° C., the coating film was overlaid (overlapped) with the film-shaped mold manufactured as described above. At this time, the film-shaped mold was pressed against the coating film with rotating and moving the pressing roll heated to 80° C. on the film-shaped mold. After that, the film-shaped mold was released or peeled off from the coating film, and then the coating film was heated at a temperature of 300° C. for 60 minutes by using an oven, to thereby perform main curing or baking of the coating film. Accordingly, the transparent base with the concave-convex pattern that was made from the sol-gel material and to which the concave-convex pattern of the film-shaped mold was transferred, was obtained. The transparent base was formed with the concave-convex pattern in which convex portions extending linearly to have an upper part width of 90 nm, lower part width of 270 nm, height of 420 nm, and extending length of 15 mm were arrayed at 270 nm pitches. The cross-sectional shape of each convex portion in a plane orthogonal to its longitudinal direction was a substantially isosceles trapezoid having an upper base of 90 nm, lower base of 270 nm, and height of 420 nm. The refractive index of the cured sol-gel material was 1.4.

On the transparent base manufactured as described above, TiO₂ was deposited until the TiO₂ film thickness reached 450 nm in a similar manner to that in Example 1. In the optical phase difference component obtained as described above, the TiO₂ film having a thickness of 50 to 100 nm was formed on each side surface of each convex portion of the transparent base as the coating layer, and the TiO₂ film having a thickness of 420 nm was formed as the closing layer. The TiO₂ films on adjacent convex portions were connected to each other to form a continuous film. Namely, the closing layer configured by the TiO₂ film was formed. Gaps closed by side surfaces of adjacent convex portions and the closing layer were formed between the adjacent convex portions. The height of the gaps was 440 nm. The refractive index of the TiO$_2$ film was 2.5. Accordingly, the optical phase difference component as depicted in FIG. 1A was obtained.

Comparative Example 1

The optical phase difference component was manufactured in a similar manner to that in Example 1, except that the TiO$_2$ film thickness was 50 nm. In the optical phase difference component as described above, the TiO$_2$ film having a thickness of 5 to 30 nm was formed on each side surface of each convex portion of the transparent base as the coating layer. Although the TiO$_2$ films were formed on convex portions of the transparent base in Comparative Example 1, the TiO$_2$ films on adjacent convex portions were separated from each other and gaps between adjacent convex portions were not closed therewith.

Comparative Example 2

The optical phase difference component was manufactured in a similar manner to that in Example 1, except that the TiO$_2$ film thickness was 120 nm. In the optical phase difference component as described above, the TiO$_2$ film having a thickness of 10 to 50 nm was formed on each side surface of each convex portion of the transparent base as the coating layer. Although the TiO$_2$ films were formed on convex portions of the transparent base in Comparative Example 2, the TiO$_2$ films on adjacent convex portions were separated from each other and gaps between adjacent convex portions were not closed therewith.

<Evaluation of Load-Bearing Property>

The load-bearing property of the optical phase difference component manufactured in each of Examples 1 to 3 and Comparative Examples 1 and 2 was measured as follows. A load of 10 kg was applied, by use of a metallic terminal (12 mmφ), to a TiO$_2$ film side of the optical phase difference component of each of Examples 1 and 3 and Comparative Examples 1 and 2 and to an ITO film side of the optical phase difference component of Example 2. Next, two polarization plates were arranged to face each other in a cross-Nicol state, and the optical phase difference component after load application was disposed between the two polarization plates. On that occasion, the optical phase difference component was disposed such that optical axes of the respective polarization plates and the extending direction of convex portions of the optical phase difference component formed an angle of 45 degrees. Next, light was emitted from a side of one of the polarization plates to the optical phase difference component, and light transmitted through the other polarization plate was observed visually. A case that brightness of the transmitted light was uniform was considered "pass", and a case that brightness of the transmitted light was not uniform was considered "failure". The table of FIG. 5 shows evaluation results, wherein "o" indicates "pass" and "x" indicates "failure". Regarding the optical phase difference component of each of Examples 1 to 3, the entire surface appeared to have uniform brightness. Regarding the optical phase difference component of each of Comparative Examples 1 and 2, the part to which load was applied looked dark, and brightness of the transmitted light was non-uniform. Thus, it can be understood that, the optical phase difference component of each of Examples 1 to 3 maintained the shape of the concave-convex pattern after load application, and the optical phase difference component of each of Comparative Examples 1 and 2 changed in the phase difference property due to deformation of the concave-convex pattern at the part to which load was applied.

It is assumed that, in the optical phase difference component of each of Examples 1 to 3, since tops of adjacent convex portions were connected by the closing layer configured by the TiO$_2$ film or the film including TiO$_2$ film and ITO film, each convex portion was supported by adjacent convex portions via the closing layer when load was applied to the closing layer. Further, it is possible to assume that, since each convex portion was connected to each other via the closing layer in the optical phase difference component of each of Examples 1 to 3, the load applied was dispersed to reduce the load to be applied to each convex portion. Thus, it is assumed that each convex portion of the optical phase difference component of each of Examples 1 to 3 was less likely to be deformed than the optical phase difference component of each of Comparative Examples 1 and 2 in which the TiO$_2$ films on adjacent convex portions were separated from each other, which prevented the concave-convex pattern of each of Examples 1 to 3 from being deformed even after a load of 10 kg was applied thereto.

<Evaluation of Change Rate of Phase Difference>

The phase difference generated by the optical phase difference component manufactured in each of Examples 1 to 3 and Comparative Examples 1 and 2 was measured by using a phase difference measurement apparatus (Axoscan manufactured by Axometrics). The table of FIG. 5 shows measurement results. The phase difference generated by the optical phase difference component was 154 nm in Example 1, 135 nm in Example 2, 140 nm in Example 3, 143 nm in Comparative Example 1, and 107 nm in Comparative Example 2. Subsequently, adhesive of which refractive index was 1.5 was applied on a cycloolefin polymer film, and the film with adhesive was caused to adhere to the TiO$_2$ film side of the optical phase difference component of each of Examples 1 and 3 and Comparative Examples 1 and 2 and to the ITO film side of the optical phase difference component of Example 2. The phase difference generated by each of the optical phase difference components with the cycloolefin polymer film adhering thereto was measured by the phase difference measurement apparatus. The table of FIG. 5 shows measurement results. The phase difference generated by the optical phase difference component was 153 nm in Example 1, 135 nm in Example 2, 138 nm in Example 3, 104 nm in Comparative Example 1, and 48 nm in Comparative Example 2. Further, the table of FIG. 5 shows a ratio of phase difference change caused by adhesion, of the optical phase difference components of Examples 1 to 3 and Comparative Examples 1 and 2. The ratio of phase difference decrease (change) by adhesion was 1% in Example 1, 0% in Example 2, and 1% in Example 3. Meanwhile, the ratio of phase difference decrease by adhesion was 27% in Comparative Example 1 and 55% in Comparative Example 2. The ratio of phase difference change (decrease) in each of Comparative Examples 1 and 2 was large.

Figure 7A:
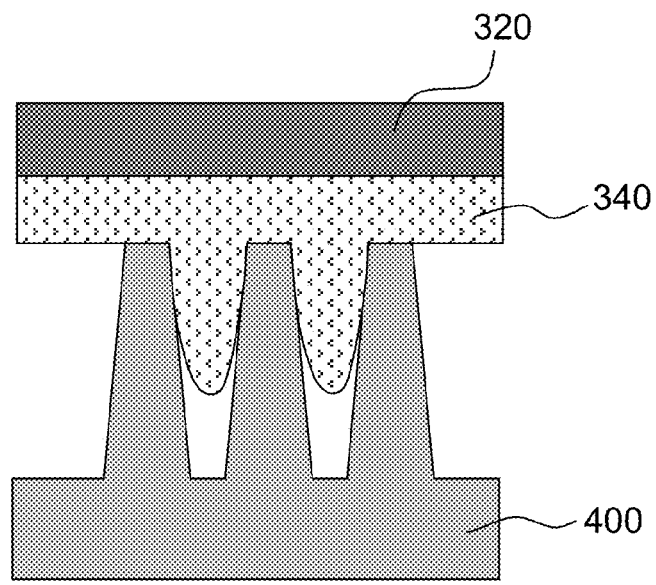
FIG. 7A is a schematic cross-sectional view of an optical phase difference component of conventional technology, wherein the optical phase difference component adheres to another component with adhesive.
Figure 7B:
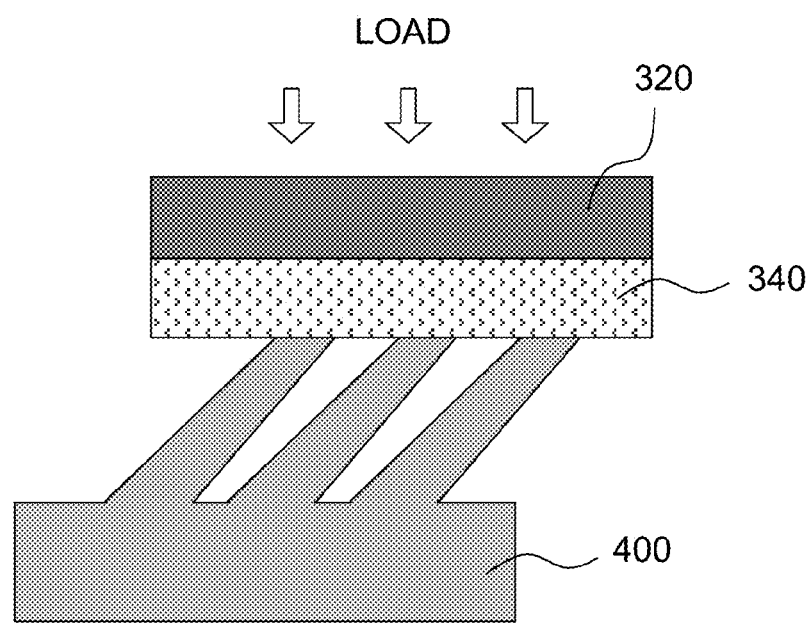
FIG. 7B is a schematic cross-sectional view of the optical phase difference component of the conventional technology, wherein load is being applied to the optical phase difference component.

In the optical phase difference component of each of Comparative Examples 1 and 2 before adhesion, the difference in refractive index between TiO$_2$ (refractive index: 2.5), which is coating surfaces of convex portions, and the gaps (refractive index: 1.0) was 1.5, and the periodic arrangement of the TiO$_2$ films and the gaps brought about the above phase difference property. In the optical phase difference component of each of Comparative Examples 1 and 2, however, the gaps between adjacent convex portions were not closed by TiO$_2$. Thus, it is assumed that, the adhesive entered gaps between convex portions as depicted in FIG. 7A, when the cycloolefin polymer film was caused to adhere to the optical phase difference component. Regarding the optical phase difference component, as depicted in FIG. 7A, in which the adhesive entered gaps between convex portions, the difference in refractive index between the coating layer (TiO$_2$ film) and the adhesive (refractive index: 1.5) was 1.0, which was smaller than the difference in refractive index between the gaps and the $TiO_2$ films, and of which contribution to the phase difference property was smaller. This may be the reason why the phase difference generated by the optical phase difference component of each of Comparative Examples 1 and 2 greatly decreased after adhesion. Meanwhile, in the optical phase difference component of each of Examples 1 and 3, the gaps between adjacent convex portions were closed by the $TiO_2$ film, and in the optical phase difference component of Example 2, the gaps between adjacent convex portions were closed by the film configured by the $TiO_2$ film and ITO film, which prevented the adhesive to enter the gaps between the convex portions. Therefore, it is assumed that, in the optical phase difference component of each of Examples 1 to 3, the periodic arrangement of the coating layer ($TiO_2$ film) and the gaps was maintained after adhesion, which resulted in the phase difference property after adhesion substantially the same as that before adhesion.

Although the present invention has been explained as above with the embodiment, the optical phase difference component manufactured by the manufacturing method of the present invention is not limited to the above-described embodiment, and may be appropriately modified or changed within the range of the technical ideas described in the following claims.

The optical phase difference component of the present invention can maintain a good phase difference property even after being incorporated into a device. Further, it is possible to prevent a situation in which the concave-convex structure is deformed due to load application and a desired phase difference can not be obtained thereby. Thus, the optical phase difference component of the present invention is suitably used for various devices, such as various functional components including, for example, antireflection films; display devices including, for example, reflective or semi-transmissive liquid crystal display devices, touch panels, and organic EL display devices; pickup devices for optical disks; and polarization conversion elements.

What is claimed is:

1. An optical phase difference component, comprising:
    a transparent base which has a substrate and a concave-convex structure layer with a concave-convex pattern;
    a coating layer which coats surfaces of concave portions and convex portions of the concave-convex structure layer, thereby forming coated convex portions;
    a gap defined between adjacent ones of the coated convex portions; and
    a closing layer provided on the coating layer to connect the coated convex portions and to close the gap,
    wherein the gap has a height higher than a height of each of the coated convex portions and the closing layer has a varying thickness, with thicker portions corresponding to positions of convex portions and thinner portions corresponding to positions of concave portions.

2. The optical phase difference component according to claim 1, wherein each of the convex portions of the concave-convex structure layer has a trapezoidal cross-sectional shape.

3. The optical phase difference component according to claim 1, wherein the coating layer has a refractive index which is greater than that of the convex portions of the concave-convex structure layer.

4. The optical phase difference component according to claim 1, wherein the coating layer and the closing layer are made of same material.

5. The optical phase difference component according to claim 1, wherein the coating layer and the closing layer are made of mutually different materials.

6. The optical phase difference component according to claim 1, wherein the coating layer is made of metal, metal oxide, metal nitride, metal sulfide, metal oxynitride, or metal halide.

7. The optical phase difference component according to claim 1, wherein the closing layer is made of metal, metal oxide, metal nitride, metal sulfide, metal oxynitride, or metal halide.

8. The optical phase difference component according to claim 1, wherein the concave-convex structure layer is made of a photo-curable resin or a thermo-setting resin.

9. The optical phase difference component according to claim 1, wherein the concave-convex structure layer is made of a sol-gel material.

10. The optical phase difference component according to claim 1, wherein the gap contains air.

11. The optical phase difference component according to claim 1, further comprising a protective component which adheres to the closing layer and/or a surface, of the transparent base, opposite to a surface with the concave-convex pattern.

12. A composite optical component, comprising:
    the optical phase difference component as defined in claim 1; and
    an optical component adhering to the closing layer or a surface, of the transparent base, opposite to a surface with the concave-convex pattern.

13. The composite optical component according to claim 12, wherein the optical component is a polarization plate.

14. A display device, comprising:
    the composite optical component as defined in claim 12; and
    a display element adhering to the closing layer or a surface, of the transparent base, opposite to a surface with the concave-convex pattern.

15. A method for manufacturing an optical phase difference component, comprising:
    preparing a transparent base having a substrate and a concave-convex structure layer which has a concave-convex pattern and is formed on the substrate;
    forming a coating layer which coats surfaces of concave portions and convex portions of the concave-convex structure layer, thereby forming coated convex portions;
    forming a closing layer on the coating layer to connect the coated convex portions and to close a gap defined between adjacent ones of the coated convex portions,
    wherein the gap has a height higher than a height of each of the coated convex portions and the closing layer has a varying thickness, with thicker portions corresponding to positions of convex portions and thinner portions corresponding to positions of concave portions.

16. The method for manufacturing the optical phase difference component according to claim 15, wherein, in the forming of the closing layer, the closing layer is formed by sputtering, chemical vapor deposition, or evaporation deposition.

17. The optical phase difference component according to claim 1, wherein the closing layer is to be joined to another component via adhesive.

* * * * *